(12) United States Patent
Hughes et al.

(10) Patent No.: US 11,662,052 B2
(45) Date of Patent: May 30, 2023

(54) PROTECTION DEVICE, ASSEMBLY AND METHOD

(71) Applicant: Tekmar Energy Limited, Newton Aycliffe (GB)

(72) Inventors: Alex Hughes, Newton Aycliffe (GB); Simon Westwood, Newton Aycliffe (GB); Terence Sheldrake, Newton Aycliffe (GB)

(73) Assignee: Tekmar Energy Limited, Newton Aycliffe (GB)

( * ) Notice: Subject to any disclaimer, the term of this patent is extended or adjusted under 35 U.S.C. 154(b) by 711 days.

(21) Appl. No.: 16/649,075

(22) PCT Filed: Aug. 13, 2018

(86) PCT No.: PCT/GB2018/052291
§ 371 (c)(1),
(2) Date: Mar. 19, 2020

(87) PCT Pub. No.: WO2019/058093
PCT Pub. Date: Mar. 28, 2019

(65) Prior Publication Data
US 2020/0271263 A1 Aug. 27, 2020

(30) Foreign Application Priority Data

Sep. 20, 2017 (GB) ...................................... 1715211
Mar. 12, 2018 (GB) ...................................... 1803901

(51) Int. Cl.
*F16L 57/06* (2006.01)
*F03D 80/80* (2016.01)
(Continued)

(52) U.S. Cl.
CPC .............. *F16L 57/06* (2013.01); *F03D 80/85* (2016.05); *F16B 7/042* (2013.01); *F16B 7/0426* (2013.01);
(Continued)

(58) Field of Classification Search
None
See application file for complete search history.

(56) References Cited

U.S. PATENT DOCUMENTS 6,310,290 B1 * 10/2001 Gretz ..................... H02G 3/065
174/64
7,390,979 B1 * 6/2008 Johnson ............... H02G 3/0691
285/194
(Continued)

FOREIGN PATENT DOCUMENTS

EP 2329174 A2 6/2011
EP 2721700 B1 4/2014
(Continued)

OTHER PUBLICATIONS

International Search Report and Written Opinion for PCT Application No. PCT/GB2018/052291 dated Nov. 7, 2018.
(Continued)

*Primary Examiner* — Krystal Robinson
(74) *Attorney, Agent, or Firm* — Troutman Pepper Hamilton Sanders LLP; Ryan A Schneider; Korbin M. Blunck

(57) ABSTRACT

A protection device for preventing damage to an elongate flexible member passing through an aperture including a body portion adapted to be inserted into the aperture in a first direction and having an internal passageway for allowing movement of an elongate flexible member therethrough, and at least one latching element pivotally mounted on the body portion. The protection device can be used for protecting an
(Continued)

elongate flexible member passing through an aperture in a support pillar of an offshore turbine generator. A method of removing the protection device from an aperture is also disclosed.

20 Claims, 23 Drawing Sheets

(51) Int. Cl.
    *F16B 7/04*       (2006.01)
    *F16L 5/00*       (2006.01)
    *F16L 37/086*     (2006.01)
    *H02G 3/22*       (2006.01)
    *H02G 15/007*     (2006.01)
    *H02G 15/18*      (2006.01)

(52) U.S. Cl.
    CPC .............. *F16L 5/00* (2013.01); *F16L 37/086* (2013.01); *H02G 3/22* (2013.01); *H02G 15/007* (2013.01); *H02G 15/1826* (2013.01)

(56) References Cited

U.S. PATENT DOCUMENTS

| | | | |
|---|---|---|---|
| 8,350,163 B2* | 1/2013 | Auray | F16L 5/00 174/665 |
| 8,399,770 B1* | 3/2013 | Phillips, Jr. | F16B 45/04 174/650 |
| 2004/0123418 A1* | 7/2004 | Jung | F16B 7/042 15/414 |
| 2009/0206226 A1* | 8/2009 | Forrest | A47C 3/20 248/354.6 |
| 2011/0226527 A1* | 9/2011 | Ritchie-Bland | F16L 35/00 174/669 |
| 2018/0306222 A1* | 10/2018 | Preston | H02G 9/02 |
| 2019/0047607 A1* | 2/2019 | Szostak | F16D 3/06 |
| 2021/0324983 A1* | 10/2021 | Krolik | F16L 25/0045 |
| 2022/0364667 A1* | 11/2022 | Jensen | H01M 10/613 |

FOREIGN PATENT DOCUMENTS

| | | |
|---|---|---|
| GB | 2463940 A | 4/2010 |
| GB | 2536075 A | 9/2016 |
| GB | 2546066 A | 7/2017 |
| GB | 2546204 A | 7/2017 |
| WO | 2010047584 A2 | 4/2010 |
| WO | 2017093725 A1 | 6/2017 |
| WO | 2017/211815 A1 | 12/2017 |

OTHER PUBLICATIONS

Combined Search Report and Examination Report under Section 17(5) for GB Application No. 1803901.6 dated Feb. 22, 2019.

* cited by examiner

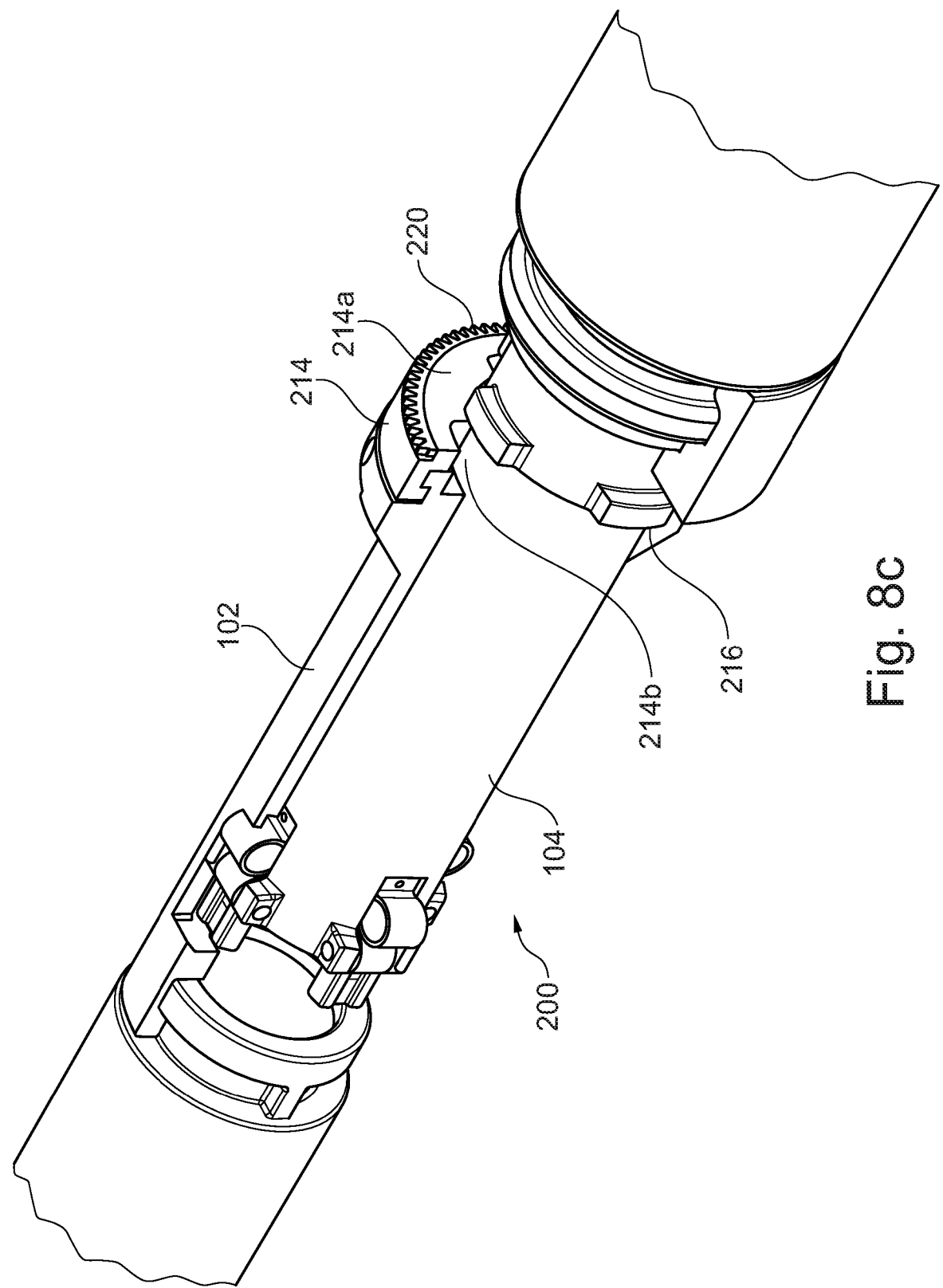

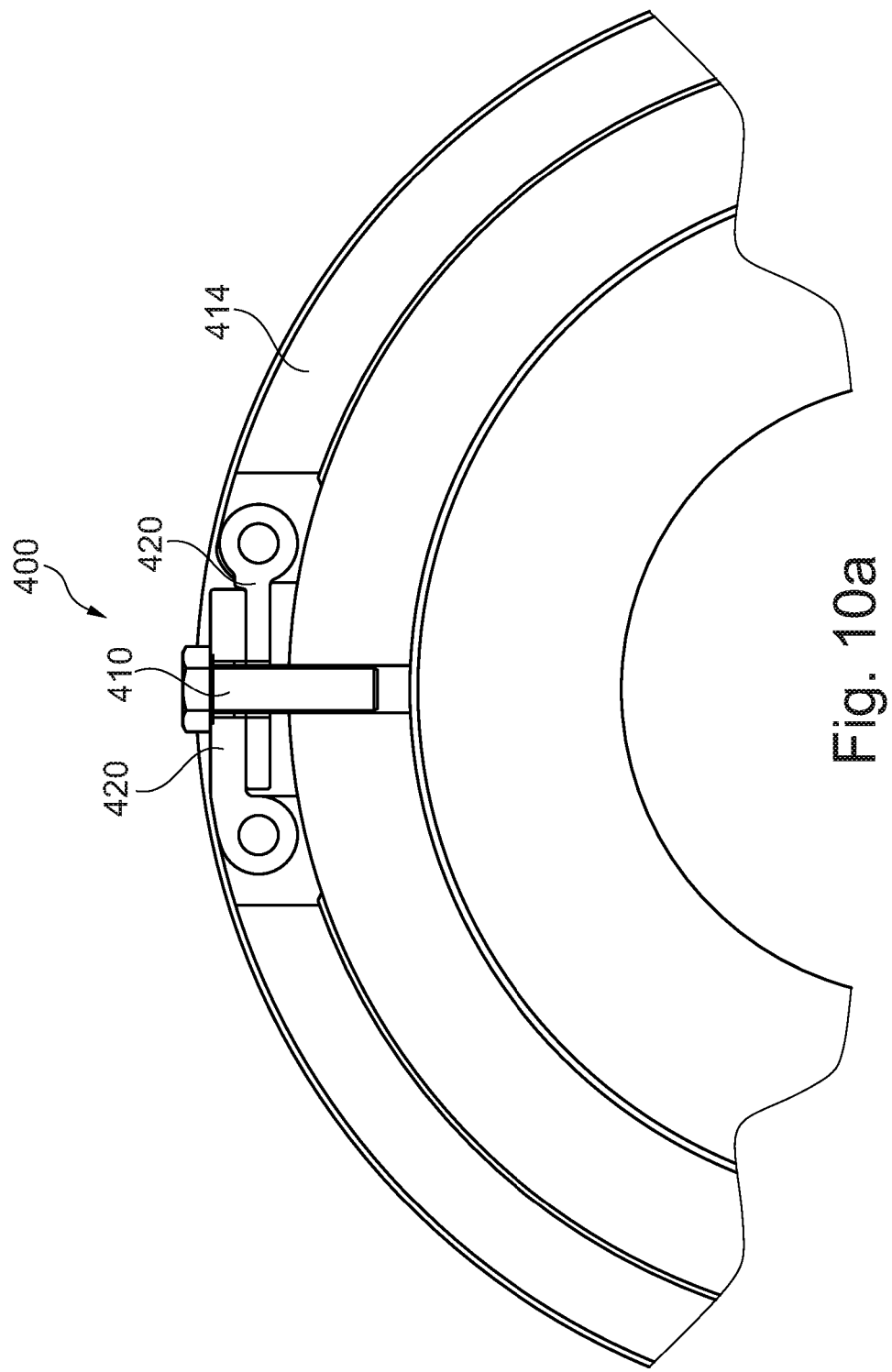

PROTECTION DEVICE, ASSEMBLY AND METHOD

The present invention relates to a protection device for protecting an elongate flexible member, and relates particularly, but not exclusively, to a protection device for protecting an elongate flexible member passing through a support pillar, for example an aperture in a support pillar, of an offshore turbine generator. The invention also relates to a method of removing the protection device from an aperture.

Power is collected from offshore wind driven turbine generators by connecting one or more generators together by means of electrical cables, and connecting at least one cable to a collection station from which power can be taken ashore by means of a further cable. The cables are connected at one end to a support pillar of the generator, which is generally embedded in the sea bed, and pass through an aperture in a wall of the support pillar from a connection point inside the support pillar, and rest on the sea bed outside of the support pillar. Because the cable outside of the support pillar is subjected to movement as a result of tides and weather, the cable is vulnerable to damage as a result of movement of that part of the cable which comes into contact with the edge of the aperture. In particular, contact with the edge of the aperture can cause the cable to be bent around a sufficiently small bend radius to cause damage. It is therefore desirable to protect such cables against damage.

One known arrangement for protecting cables from damage at the location at which they pass through the aperture in the support pillar of a turbine generator consists of attaching a cable protector (known as a J-tube) to the support. The J-tube has a straight portion and a curved portion and is mounted to the aperture such that the curved portion passes through the aperture. The J-tube then acts as a cable guide and prevents the bending radius about which the cable is bent at the edge of the aperture from becoming less than a specified minimum value, which could cause damage to the cable.

The J-tube is mounted to the support pillar of the turbine either before or after installation of the support pillar into the seabed. However, this arrangement suffers from the drawback that because the supports are generally installed by driving them into the seabed, which subjects the supports to significant mechanical stresses, J-tubes mounted to the support before installation of the support in the sea bed can become damaged or dislodged during subsequent installation of the support in the sea bed or must be made sufficiently robust that the cost becomes prohibitive. On the other hand, if the J-tube is mounted to the support pillar after installation of the support, the cost of installation becomes extremely high, as a result of the need for specialist equipment and personnel to carry out such offshore installation.

Another arrangement is known in which a support (known as an I-tube) is mounted to the external surface of the support for preventing the bending radius of the cable form becoming less than a specified minimum value. Although I-tubes are easier (and therefore less expensive) to install than J-tubes, installation is nonetheless expensive, and it is difficult to provide an I-tube having performance as satisfactory as that provided by a J-tube.

EP2329174 describes a mechanical latch for preventing damage to a cable passing through an aperture. The mechanical latch housing includes latching fingers protruding from the housing, which once inserted prevent removal of the housing from an aperture, and prevents the cable engaging the edge of the aperture.

WO 2017/093725 describes a protection assembly for mounting in an underwater support structure. The protection assembly includes a retaining device, which is removeable using a release tool used to move a release collar away from a stop collar.

GB2536075 describes a mounting device for an elongate flexible member passing through the wall of a structure. The mounting device is removable by using an ROV (Remotely Operated Vehicle) to urge a ball retracting sleeve of the mounting device towards a collar portion.

Current systems are reliant on a close fit with the aperture of the monopile/support pillar to prevent unwanted removal therefrom.

Current systems require the use of complex ROV procedures to remove the device from the aperture. For example, an ROV is needed to actuate the release mechanism. Such actuation typically requires the ROV to apply a significant load to actuate the release mechanism, which places restrictions on the ROV that can be used.

According to a first aspect of the present invention there is provided a protection device for preventing damage to an elongate flexible member passing through an aperture, the device comprising:
  a body portion adapted to be inserted into the aperture in a first direction and having an internal passageway for allowing movement of an elongate flexible member therethrough;
  at least one latching element pivotally mounted on said body portion;
  wherein the at least one latching element is for engaging an edge of the aperture to prevent removal of the body from the aperture in a second direction, opposite to said first direction, after insertion of said body into said aperture in said first direction, to prevent the elongate member from engaging the edge of the aperture;
  wherein the at least one latching element is pivotally mounted to said body portion for moving between:
    a first position enabling insertion of said body into said aperture in said first direction,
    a second position preventing removal of said body from said aperture in said second direction, and
    a third position enabling removal of said body from said aperture in said second direction.

Suitably, the body portion is configured to move from a first configuration, preventing the at least one latching element from moving to the third position, and a second configuration enabling at least one latching element to move to the third position.

Suitably, the body portion comprises a shaft element and a sleeve member surrounding the shaft element.

Suitably, the at least one latching element is pivotally mounted on the shaft element.

Suitably, when the body portion is in the first configuration, the sleeve member is configured to prevent the at least one latching element moving to the third position.

Suitably, the sleeve member comprises at least one opening, through which the at least one latching element projects.

Suitably, the at least one latching element is biased in a direction towards the third position.

Suitably, the sleeve member is configured to slide axially relative to the shaft element to move the body portion from the first configuration to the second configuration.

Suitably, the at least one latching element is biased away from the first position.

Suitably, when in the first position, the at least one latching element is oriented in a first direction, and when in the third position, the at least one latching element is oriented in a second direction, substantially opposed to the first direction.

Suitably, the device further comprises a collar member, extending at least partially around the body portion.

Suitably, the collar member is configured to have a locked configuration and an unlocked configuration, wherein in the locked configuration the body portion is fixed in the first configuration by the collar member, wherein in the unlocked configuration the body portion is moveable from the first configuration to the second configuration.

Suitably, the collar member comprises two or more segments.

According to a second aspect of the present invention there is provided a protection assembly for an elongate flexible member comprising:
- a protection device according to the first aspect of the invention; and
- a bend limiting device for resisting bending of an elongate flexible member passing through the aperture, the bend limiting device comprising:
    - an elongate flexible body adapted to pass through the aperture and having an internal passageway for allowing movement of an elongate flexible member therethrough; and
    - attachment means adjacent a first end of said body for enabling attachment of a pulling member thereto to enable pulling of the device through the aperture.

According to a third aspect of the present invention there is provided a method of removing the protection device according to the first aspect of the invention from an aperture, the method comprising:
- actuating movement of at least one latch element from the second position to the third position;
- removing the protection device from the aperture in the second direction.

Certain embodiments provide the advantage that the protection device is retractable from an aperture.

Certain embodiments provide the advantage that the protection device can function with a loose fit between the protection device and the monopile aperture. This allows the protection device to be installed quickly offshore and maximises the permissible installation angles.

Certain embodiments provide the advantage that the retraction of the protection device is less reliant on the load capacity of an ROV compared to known systems.

Certain embodiments provide the advantage that the effect of marine growth and sedimentation on the retraction of the protection device is minimal.

Embodiments of the invention are further described hereinafter with reference to the accompanying drawings, in which:

FIGS. 8a, 8b and 8c illustrate another protection device;

FIGS. 10a, 10b and 10c illustrate another protection device;

In the drawings like reference numerals refer to like parts.

Figure 1:
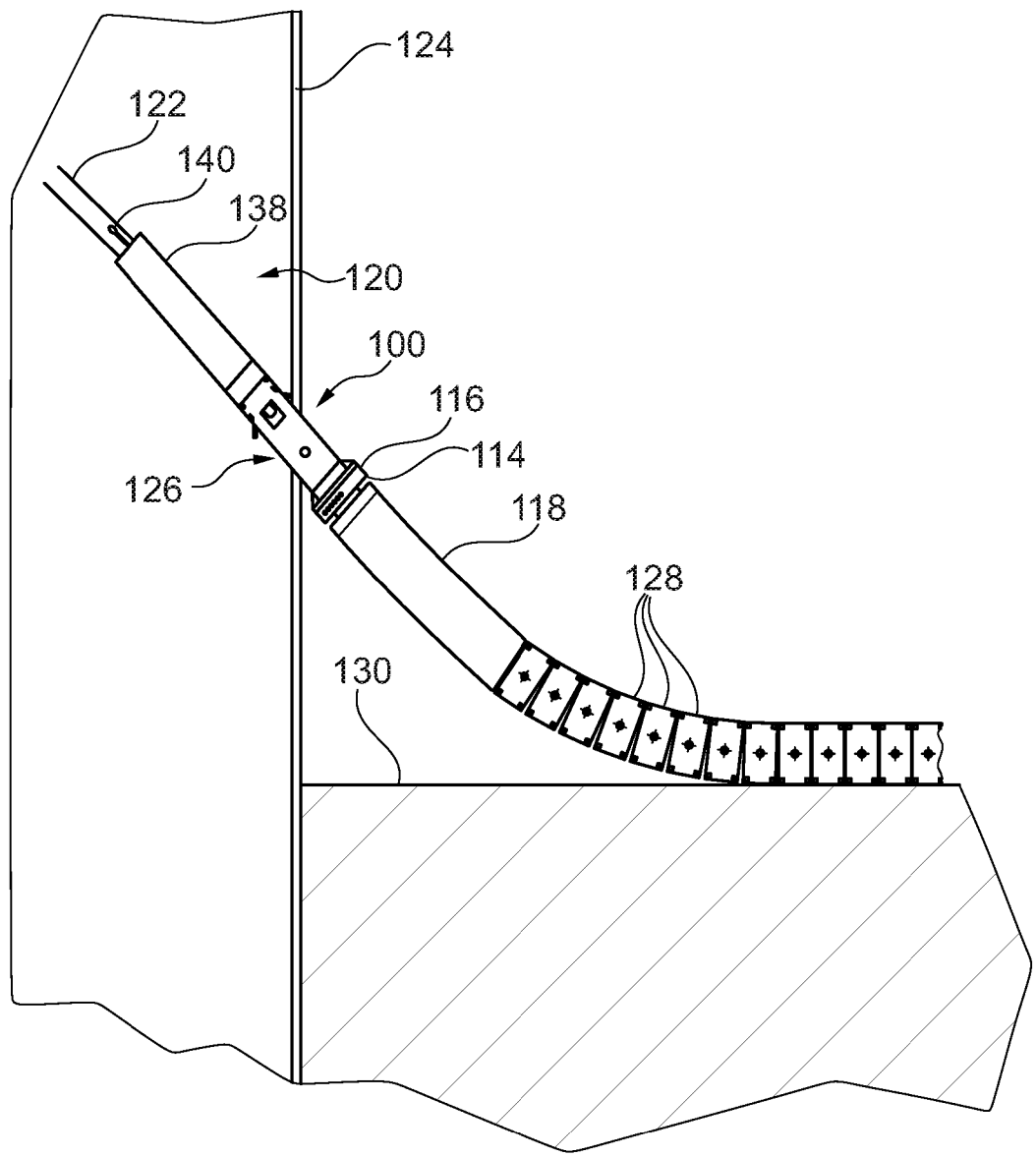
FIG. 1 illustrates a side view of a protection assembly, including a protection device, installed through a monopile aperture (where the monopile is shown as a cross-section)

FIG. 1 illustrates a protection device 100 for preventing damage to an elongate flexible member passing through an aperture 126. The protection device 100 includes a body portion adapted to be inserted into the aperture 126 in a first direction.

In the example shown in FIG. 1, the protection device 100 is shown as part of a protection assembly including the protection device 100 and a bend limiting device 120 for resisting bending of an elongate flexible member 122 passing through the aperture 126 of a monopile 124. The bend limiting device 120 includes an elongate flexible body 138 adapted to pass through the aperture 126 and having an internal passageway for allowing movement of the elongate flexible member 122 therethrough. Attachment means 140 are adjacent a first end of said body for enabling attachment of a pulling member thereto to enable pulling of the device through the aperture 126. The bend limiting device 120 includes mounting means (not shown in FIG. 1) for mounting the bend limiting device 120 to the protection device 100.

The protection assembly further includes a second bend limiting device 118 adapted to be mounted at an opposing end of the protection device 100, relative to the bending limiting device 120. The second bend limiting device 118 includes an elongate flexible body having an internal passageway for passage of an elongate flexible member therethrough. The second bend limiting device 118 is mounted to a third bend limiting device, which includes a plurality of bend restriction members 128. Each of the plurality of bend restriction members 128 has a respective passageway to enable passage of an elongate flexible member therethrough. Each bend restriction member 128 is adapted to be mounted to at least one further said bend restriction member to allow limited pivotal movement of said bend restriction members 128 relative to each other.

Figure 2:
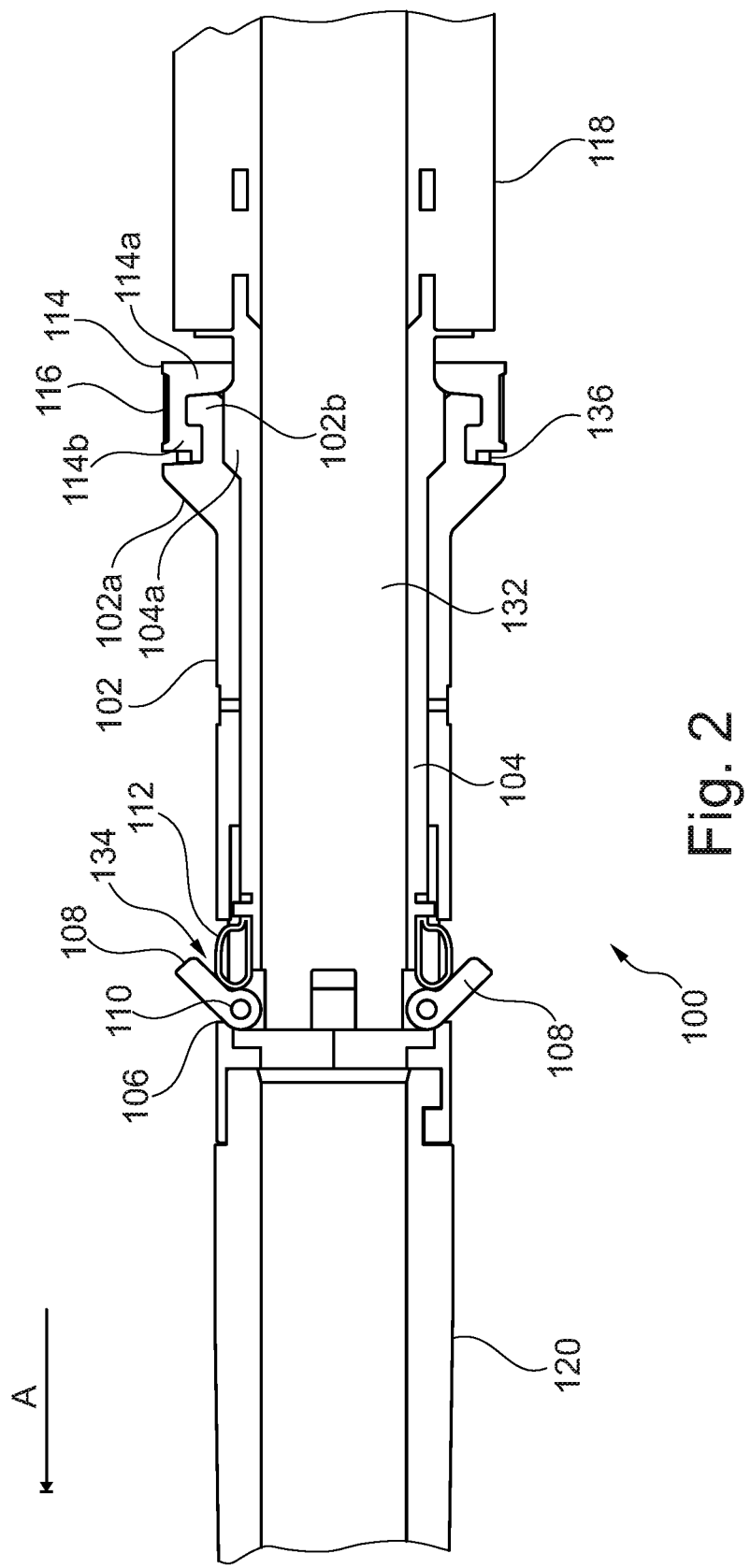
FIG. 2 illustrates a cross-section of the protection device of FIG. 1 with latching elements in a second position.

FIG. 2 illustrates a cross section of the protection device 100 of FIG. 1. The body portion has an internal passageway 132 for allowing movement of an elongate flexible member therethrough. The protection device further includes at least one latching element 108 pivotally mounted on said body portion. The at least one latching element is configured for engaging an edge of the aperture 126 to prevent removal of the body portion from the aperture in a second direction, opposite to said first direction, after insertion of the body portion into the aperture in said first direction. When inserted in the aperture the body portion prevents the elongate member from engaging the edge of the aperture. The at least one latching element 108 is pivotally mounted (or connected) to said body portion. The at least one latching element can thereby move between a first position enabling insertion of the body portion into the aperture 126 in the first direction, a second position preventing removal of said body portion from the aperture 126 in the second direction, and a third position enabling removal of the body portion from the aperture 126 in the second direction.

Figure 3:
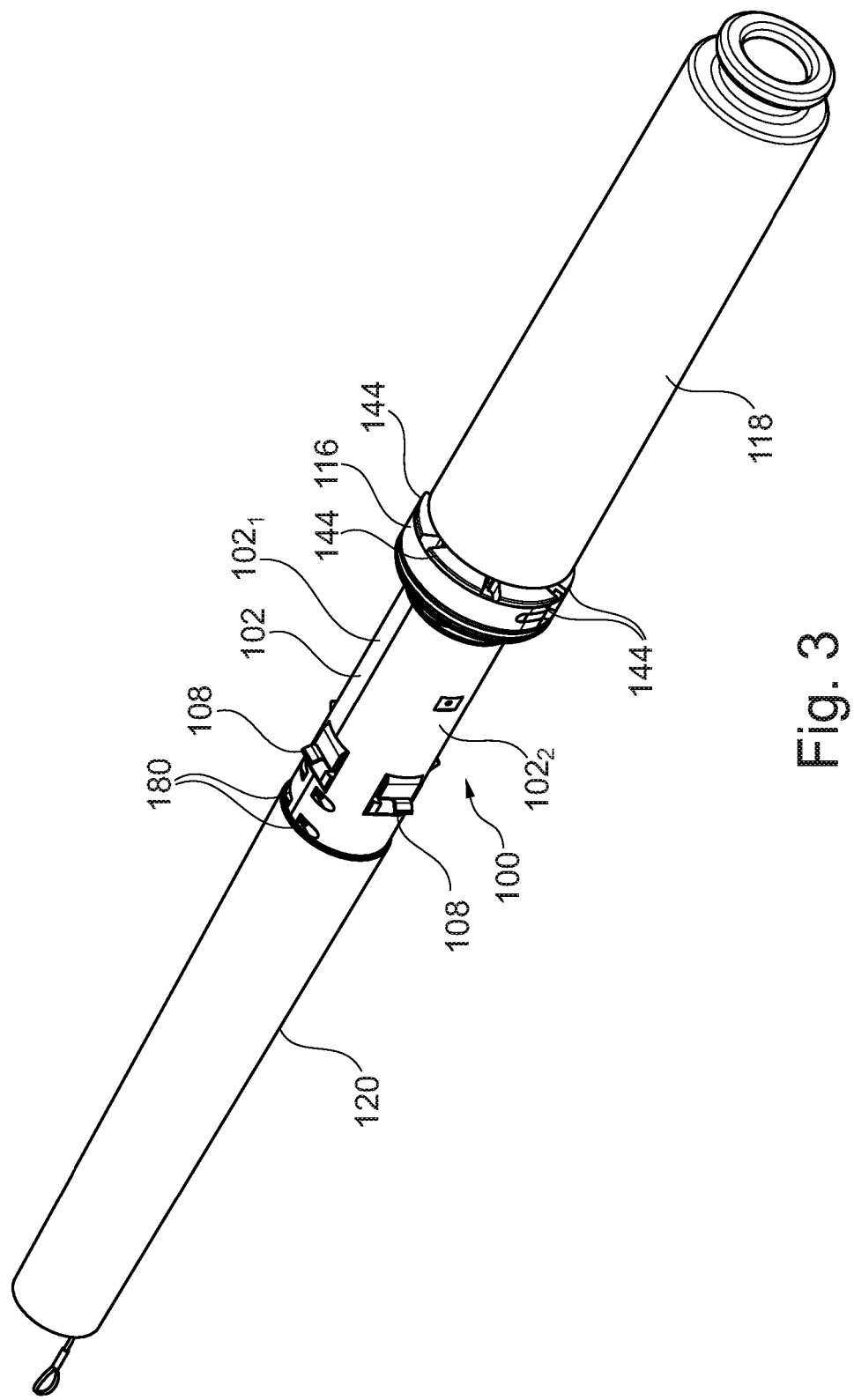
FIG. 3 illustrates a perspective view of the protection device of FIG. 2.

The body portion includes a shaft element 104 and a sleeve member 102 surrounding the shaft element 104. In this example the shaft element 104 is a tubular element. In this example the sleeve member 102 includes two half sleeve members $102_1$, $102_2$, extending partially around the circumference of the shaft element 104 (as shown in FIG. 3). The half sleeve members $102_1$, $102_2$ are connected by fasteners, in this case bolts (not shown) through connecting holes 180. In this example, the shaft element 104 and sleeve member 102 are both made from cast iron grade steel, however any suitable material may be used. For example, one or both of the shaft element 104 and sleeve member 102 may alternatively be made from carbon steel, a polymer or a composite, or any combination thereof.

In this example, there are two latching elements 108 situated at opposing sides of the body portion. The latching elements 108 are pivotally mounted on the shaft element 104. The latching elements are pivotally mounted to the shaft element 104 by pins 110. In this example, the pins are mounted to the shaft element 104 via eyelets formed within a recess in the shaft element 104. In this example, the two latching elements 108 are steel latching fingers.

The sleeve member 102 includes at least one opening 134 through which the at least one latching element 108 projects. In this example, there are two openings 134 through which each of the latching elements 108 projects.

The protection device 100 includes at least one biasing element 112. In this example, there is a biasing element associated with each latching element 108. The biasing element 112, in this example, is an elastomeric spring. Specifically, in this example, the elastomeric spring is a PU spring.

FIG. 1 and FIG. 2 illustrate the latching elements 108 in the second position. In the second position the latching elements 108 project outwardly from the body portion such that they engage with a surface around an aperture in which the device is inserted. In other words, in the second position the latching elements 108 are angled away from the longitudinal axis of the protection device 100 (i.e. the longitudinal axis of the internal passageway 132 of the protection device 100). Aptly, in the second position the latching elements 108 are at an angle of between 15 and 70 degrees from the axis of the protection device 100. More aptly, the latching elements 108 are at an angle of 45 degrees from the axis of the protection device 100.

In use, the cable 122 is inserted into the protection assembly prior to installation such that the leading end of the cable 122 protrudes slightly from the leading end of the first bend limiting device 120. A pulling line (not shown) preinstalled in the monopile, is retrieved by a diver or ROV and transferred to the end of the cable 122 located on a vessel (not shown) at the surface such that the end of the pulling line is attached directly to the leading end of the cable 122 and attached to the connection means 140, which includes loops.

The cable 122 passing through the cable protection assembly is then supported at a suitable location along its length by means of suitable apparatus, for example a crane or A-frame on a ship (not shown). The cable is then fed forwards, while the pulling line is pulled as a result of which the cable 122 and cable protection assembly are pulled into the aperture 126.

As the protection device 100 is pulled through aperture 126 in a direction A (as marked on FIG. 2), the latching elements 108 engage with an edge of the aperture. Upon application of additional force to the protection device 100 in the direction A, the edge of the aperture 126 applies a force to the latching elements 108 in an opposite direction to A, such that the latching elements 108 will pivot about latch pin 110 and compress the biasing element 112. The latching elements 108 will further pivot about latch pin 110 and further compress the biasing element 112 until the latching elements 108 are substantially parallel with the protection device 100, i.e. the latching elements are in the first position, such that the latching elements can pass through the aperture. The protection device 100 can be further inserted until flared portion 102a of the sleeve member engages with the aperture.

In this example, the outside protection device has an outer diameter of substantially 320 mm (i.e. the outer diameter of the sleeve member 102) whilst the aperture 126 has a diameter of substantially 340 mm.

The latching elements 108 are biased away from the first position. That is, once the latching elements 108 have passed through the aperture 126, the biasing element 112 will apply a force to the latching elements 108, such that the latching elements 108 move away from the first position. In this example, the latching elements 108 move back to the second position. In the second position, the latching elements 108 prevent withdrawal of elongate element from monopile, by engaging with a surface around the aperture 126 (e.g. the monopile wall).

In this example, a back-stop surface 106 of the sleeve member 102 prevents the biasing element 112 from forcing the latching elements 108 past the second position. The back-stop surface, in this example, is an edge of the opening 134 in the sleeve member 102.

During insertion of the protection device 100 through the aperture, the body portion (i.e. the sleeve member 102 and the shaft element 104) is in a first configuration, i.e. a first position of the sleeve member 102 relative to the shaft element 104. In this first configuration, the latching elements 108 are moveable between the first and second positions.

The protection device 100 further comprises a collar member 114, extending at least partially around the body portion. In this example, the collar member 114 extends at least partially around both the sleeve member 102 and the shaft element 104.

The collar member 114 is configured to have a locked configuration and an unlocked configuration. In the locked configuration, the body portion is fixed in the first configuration by the collar member 114.

The collar member 114 is configured to fix the position of the sleeve member 102 with respect to the shaft element 104. In this example, the collar member 114 includes flange 114a, which engages with a flange 104a of the shaft element, and further flange 114b, which engages with the flared portion 102a of the sleeve member and a flange 102b of the sleeve member, to prevent relative axial movement between the sleeve member 102 and the shaft element 104.

In this example, the collar member is fixed in the locked configuration by a band element 116, extending radially around the collar member 114. FIG. 3 illustrates a perspective view of FIG. 2, where the band element 116 can be seen extending around the collar member 114.

The band element is a high tensile stiffness and strength band. In this example, the band element is configured from aramid fibres coated with PU.

The collar member 114 includes two or more segments. In this example, the collar member 114 includes a plurality of segments 144. As shown in FIG. 3, the segments are arranged around the circumference of the sleeve member 102. The band element 116 applies a tension to the segments 144 of the collar member 114, to keep them in close engagement with the body portion, i.e. to keep the collar member 114 in the locked position.

The tension of the band element 116 also brings the segments 144 of the collar member 114 into abutting engagement with neighbouring segments in the circumferential direction.

Figure 4:
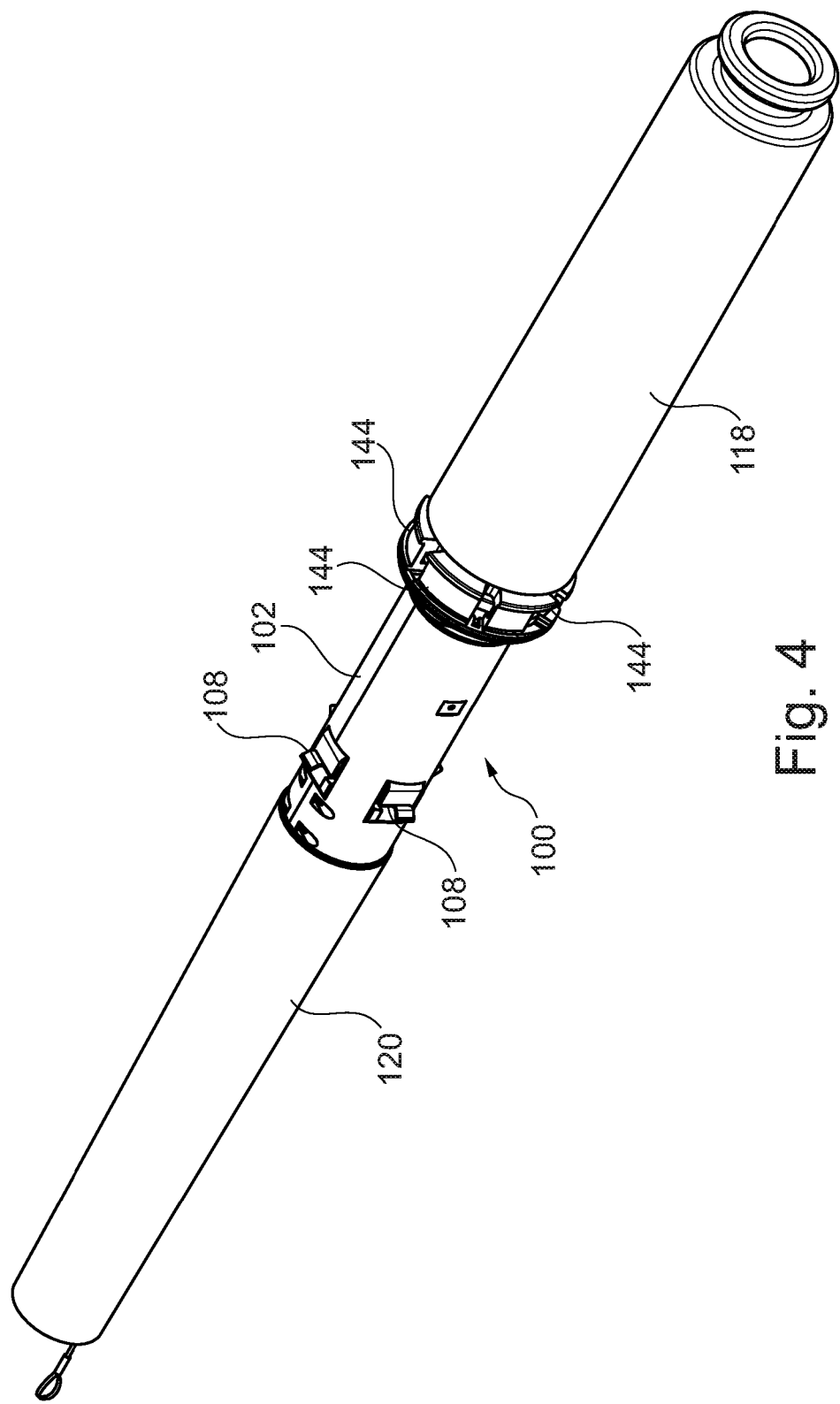
FIG. 4 illustrates a perspective view of the protection device of FIGS. 2 and 3, with the band element removed.

In use, the band element 116 is detached to allow the collar member 114 to move to the unlocked configuration. In this example, detachment of the band element 116 is achieved using a standard scissor manipulator attachment on an ROV. Alternatively, detachment of the band element 116 can be done with a spinning wheel or knife attached to an ROV. As the band element 116 is cut, the segments 144 of the collar member 114 displace radially outwardly into the unlocked configuration. The segments 144 are prevented from falling away from the body portion by secondary band element 136. In this example, the secondary band is elastomeric. FIG. 4 illustrates the arrangement of FIG. 3 with the band element 116 detached and the collar member 114 in the unlocked position.

In the unlocked configuration, the collar member 114 (i.e. the segments 144 thereof) is displaced radially outwardly such that the flange 114a of the collar member 114 no longer restricts the axial movement of the flange 104a of the shaft element 104 in a direction opposite to the direction A. That is the flange 104a is disengaged with the flange 114a. The tension provided by secondary band element 136 ensures the further flange 114b of the collar member 114 remains between the flared portion 102a and the flange 102b of the sleeve member 102, such that there can be no relative movement between the collar member 114 and the sleeve member 102.

In the unlocked configuration, the body portion is moveable from the first configuration to a second configuration. That is, the shaft element 104 is moveable relative to the sleeve member 102 (and collar member 114) to a second configuration. In this example, the sleeve member 102 is configured to slide axially relative to the shaft element 104 to move the body portion from the first configuration to the second configuration.

In use, to withdraw the protection device 100 from the aperture 126 of the monopile 124, the collar member 114 is first brought into its unlocked configuration as discussed above, allowing the body portion to be moved to its second configuration.

An ROV is deployed to attach a winch cable (not shown) to the protection assembly. In this example, the winch cable is attached to one of the plurality of bend restriction members 128. Upon application of a winching force to the winch cable from the deck of the vessel a force is applied to the protection device 100 in a direction opposite to direction A.

The force acts to move the body portion to its second configuration. That is, the shaft element 104 slides axially away from the aperture 126 relative to the sleeve member 102.

The face of the flange 104a of the shaft element 104 in engagement with the flange 114a of the collar member 114 is sloped. As such, if release of the band element 116 does not allow sufficient outward radial displacement of the collar member to allow the collar member to become fully 'unlocked' (i.e. the flanges 104a and 114a are still in engagement) then the sloped face of flange 104a will force the collar outwardly as the shaft element 104 slides axially relative to the sleeve member 102. That is, the shaft element 104 includes an angled face on a radially outer surface thereof. The angled face of the shaft element is configured to displace the segments of the collar member radially outwardly as the body portion is moved from the first configuration to the second configuration.

Figure 5:
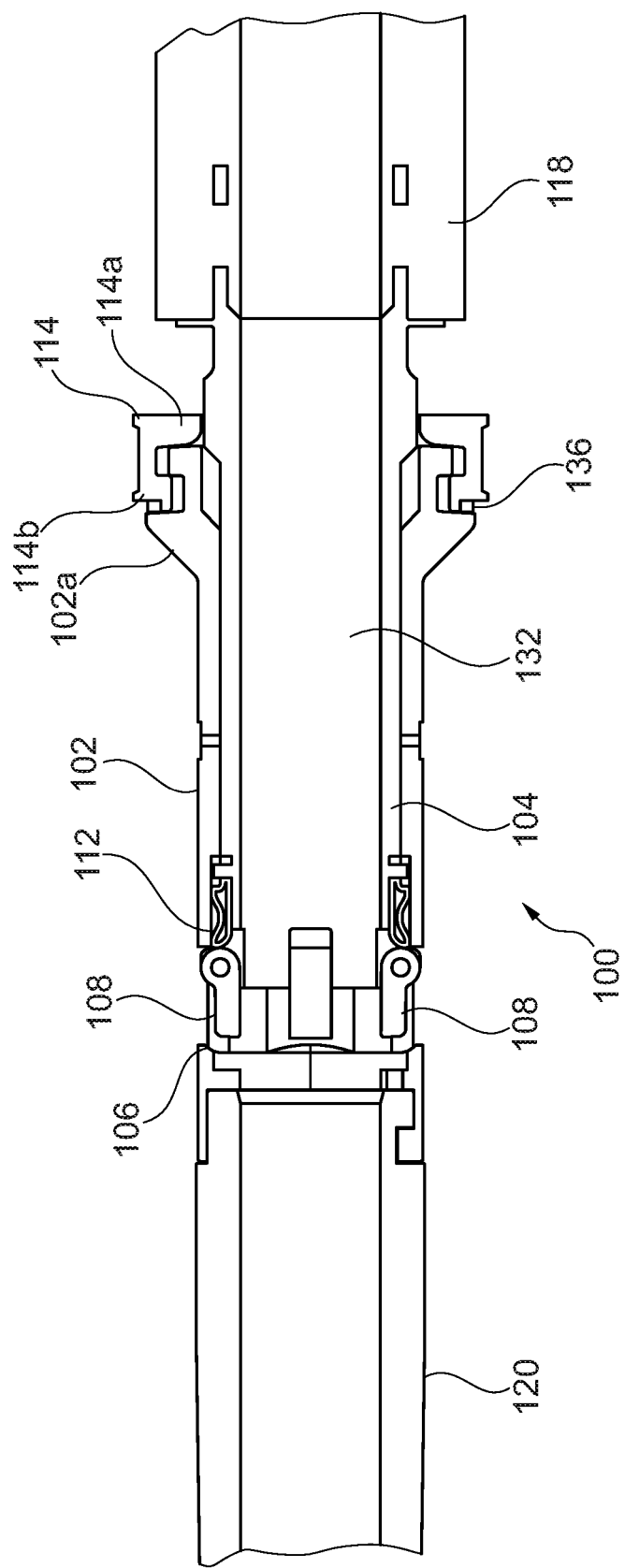
FIG. 5 illustrates a cross-section of the protection device of FIGS. 2 to 4, with the latching elements in a third position.

When the body portion is in the second configuration, the latching elements 108 are able to move to a third position. FIG. 5 illustrates the protection device 100, where the body portion is in the second configuration and the latching elements 108 are in the third position.

When the body portion is in the second configuration, the biasing element 112 is retracted to prevent damage. That is, as the sleeve member 102 moves relative to the shaft element 104, the biasing element 112 is compressed, or enclosed by the sleeve member 102, such that in the second configuration, the biasing element 112 is positioned radially inwardly from the sleeve member 102, as shown in FIG. 5.

In this example, in the third position the latching elements are positioned substantially parallel with the axis of the shaft element.

When the body portion is in the first configuration, the latching elements are prevented from moving to the third position. That is, when the body portion is in the first configuration, the sleeve member is configured to prevent the at least one latching element moving to the third position. As shown in FIG. 2, the back-stop surface 106 prevents the latching elements moving to the third position.

In use, as the shaft element 104 is moved relative to the sleeve member 102, the back-stop surface 106 of the sleeve member 102 moves away from the latching elements 108, enabling the latching elements to move past (i.e. pivot beyond) the second position.

The at least one latching element 108 is biased in a direction towards the third position. As the back-stop surface 106 moves away from the latching elements 108, the biasing element 112 urges the latching elements past the second position towards the third position. In this example, the combination of the biasing force of the biasing element 112 and the self-weight of each latching element 108, brings the latching elements 108 to the third position.

Once the latching elements 108 are in the third position, the protection device 100 can pass out of the aperture 126. That is the protection device is removed from the aperture by moving the latching elements from a second position to a third position and removing the protection device from the aperture.

Figure 6:
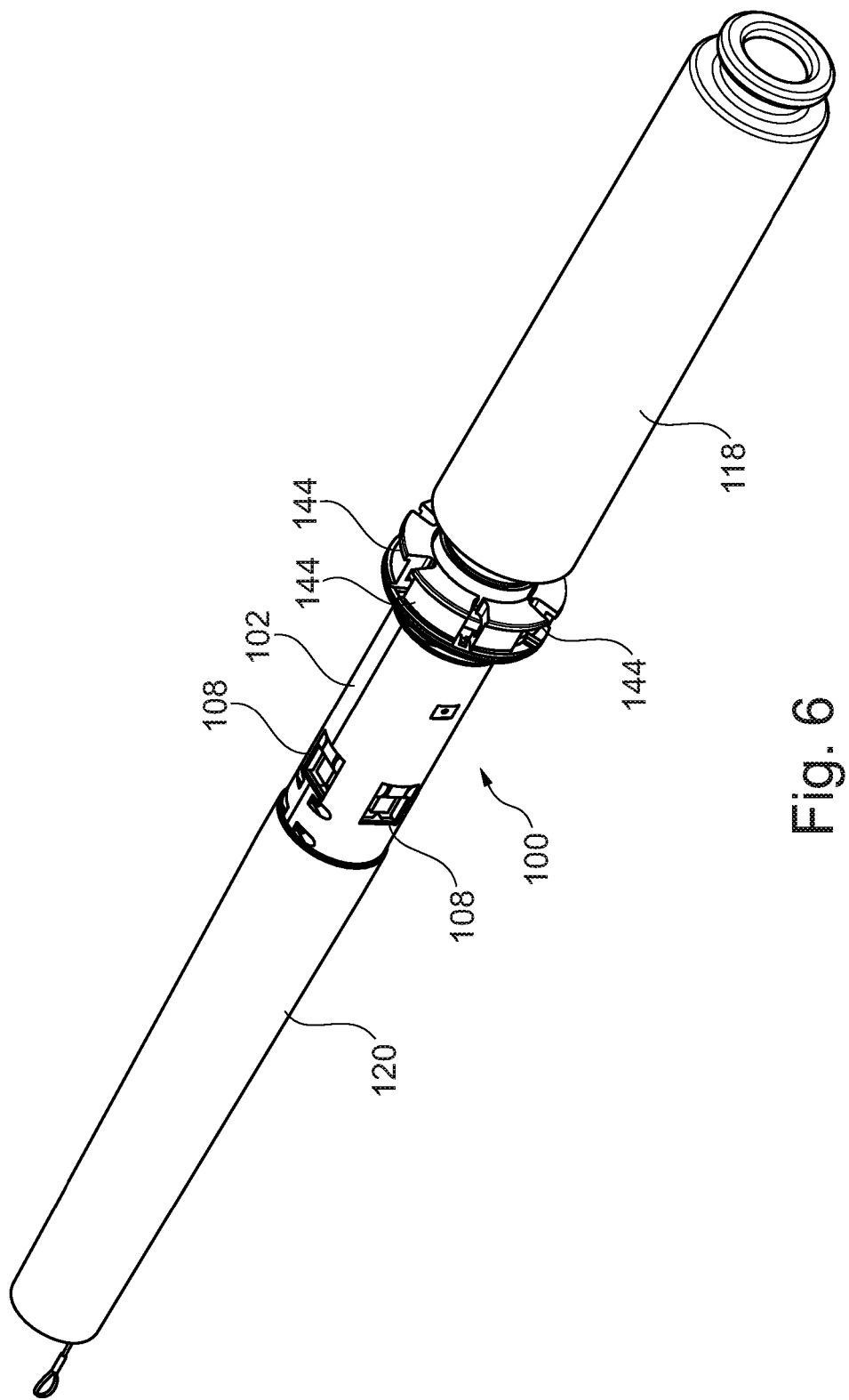
FIG. 6 illustrates a perspective view of the arrangement of FIG. 5.
Figure 7:
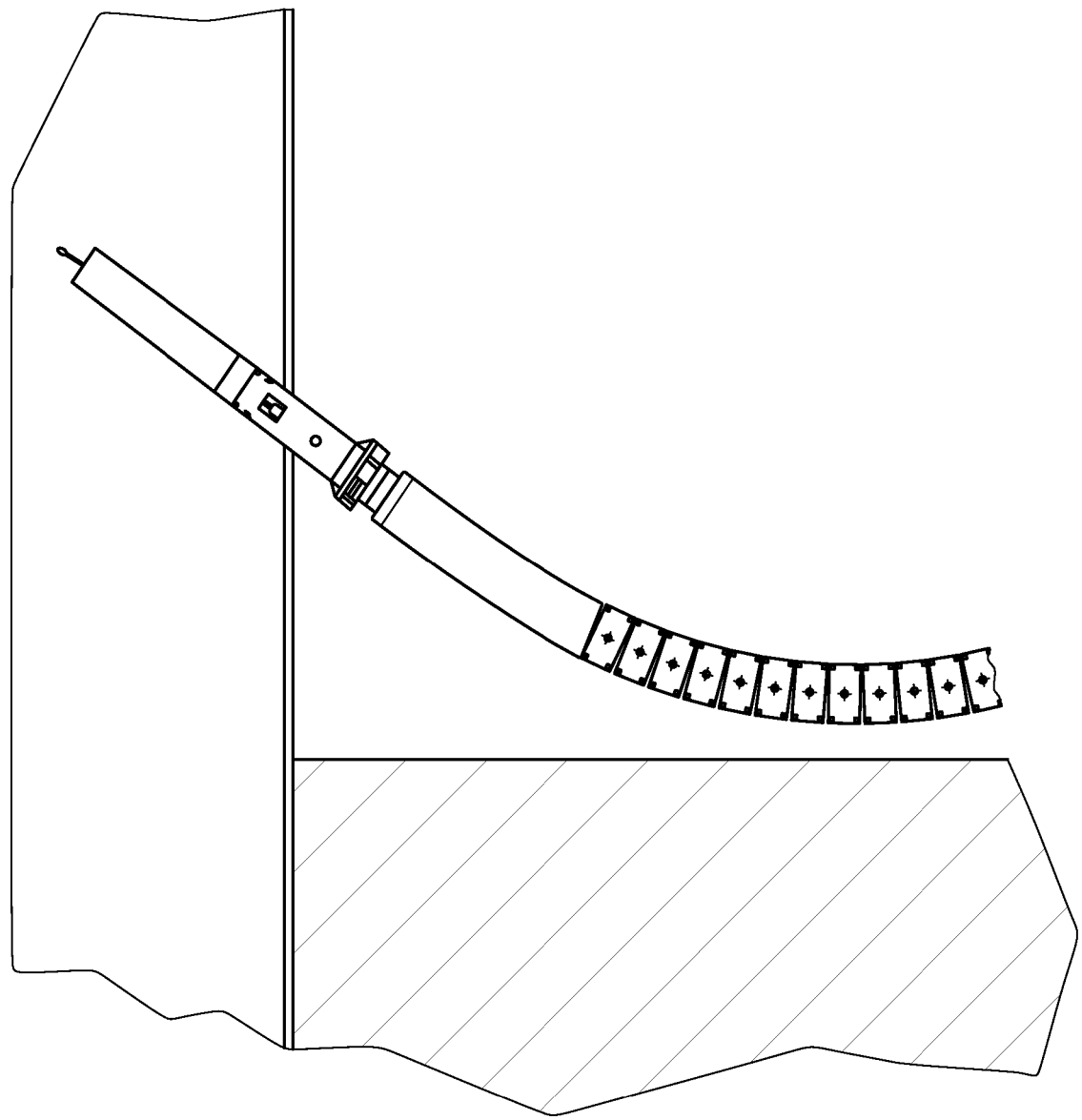
FIG. 7 illustrates a side view of a protection assembly, including a protection device in the configuration shown in FIG. 5.

FIG. 6 illustrates the protection assembly with the latching elements 108 of the protection device 100 in the third position. FIG. 7 illustrates the protection assembly with the latching elements 108 of the protection device 100 in the third position during removal of the protection assembly.

In the first position, the latching elements are oriented in a first direction. In the third position, the latching elements are oriented in a second direction, substantially opposed to the first direction. That is, the third position is distinct from (or different to) the first position.

Figure 8A:
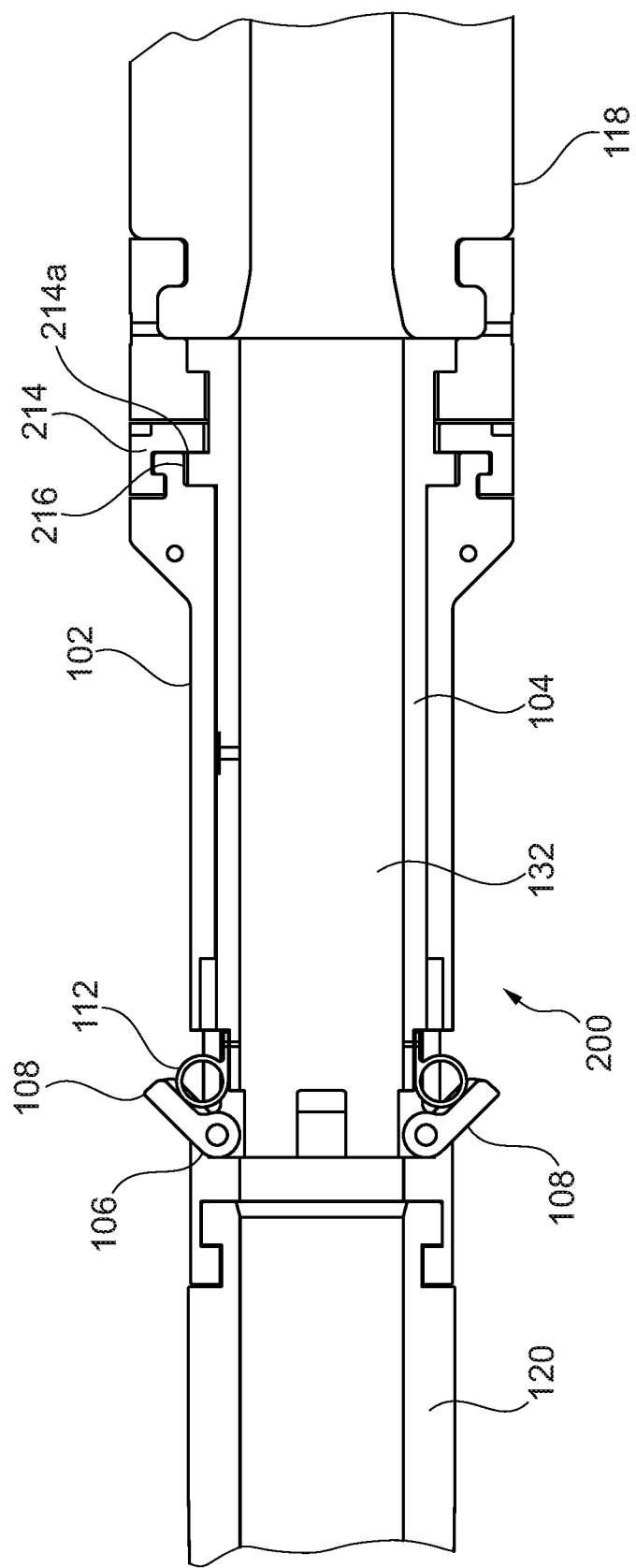
Figure 8B:
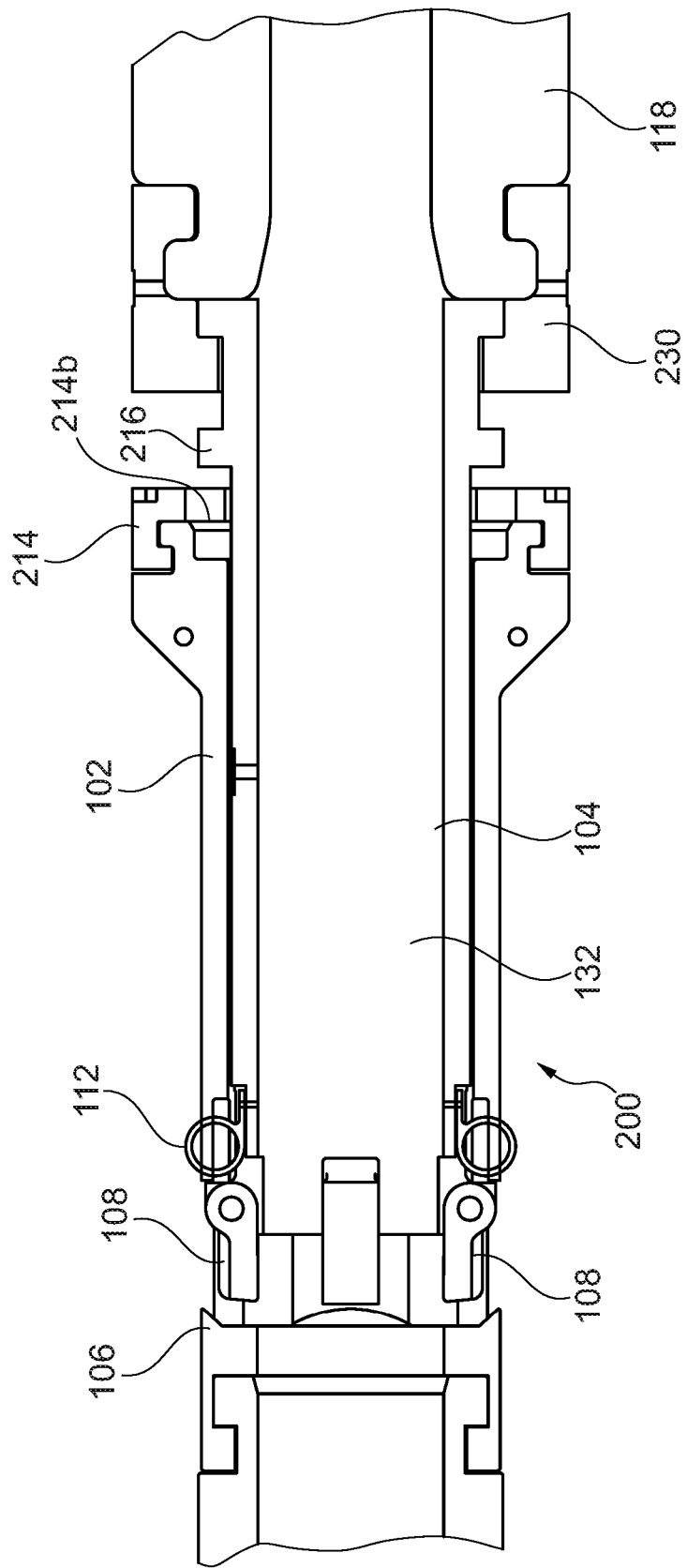

FIGS. 8a and 8b illustrate another protection device 200. Many of the features are substantially the same as those described above in relation to FIGS. 1 to 7, so for brevity will not be described again in detail. In this example, the shaft element 104 includes lugs 216 on a radially outer surface thereof, and the collar member 214 includes keys 214a on a radially inner surface thereof. The collar member 214 is fixed in the locked configuration by engagement of the lugs 216 with keys 214a. That is, as shown in FIG. 8a, the engagement of the lugs 216 with keys 214a prevents relative axial movement between the sleeve member 102 and the shaft element. In this example, there are four lugs 216 spaced around the circumference of the shaft element 104, with a corresponding number of keys 214a in the collar member 214.

The collar member 214 is released from the locked configuration into the unlocked configuration by rotation of the collar member 214 relative to the body portion, such that the keys 214a are offset from the lugs 216.

In this example, as shown in FIG. 8c, the collar member 214 includes key-slots 214b located circumferentially between the keys 214a. Upon rotation of the collar member 214 by a predetermined amount, the lugs 216 of the shaft element 104 align axially with the key-slots 214b. The keys 214a align axially with gaps between the lugs 216 of the shaft element.

Once the collar member 214 is in the unlocked configuration, as with the previous example, the body portion is moveable from the first configuration to the second configuration. That is, axial movement of the sleeve member 102 is permitted relative to the shaft element 104. FIG. 8b illustrates the protection device 200 in the second configuration, with the latching elements in the third position.

In this example, the collar member 214 include an external gear profile 220 (as shown in FIG. 8c) to allow a suitable ROV operated tool to be installed onto and rotate the collar member 214.

In this example the collar member 214 is held in the locked configuration by a shear pin, which is sheared upon rotation of the collar by the ROV operated tool, although any suitable mechanism to hold the collar member in the locked configuration may be used.

In this example, the protection device includes a further collar member 230, for coupling the shaft element 104 to the second bend limiting device. In this example the further collar member 230 includes two halves secured by bolts or other coupling means. The further collar member locks over annular collars located on the end of both the shaft element 104 and the second bend limiting device.

Figure 9:
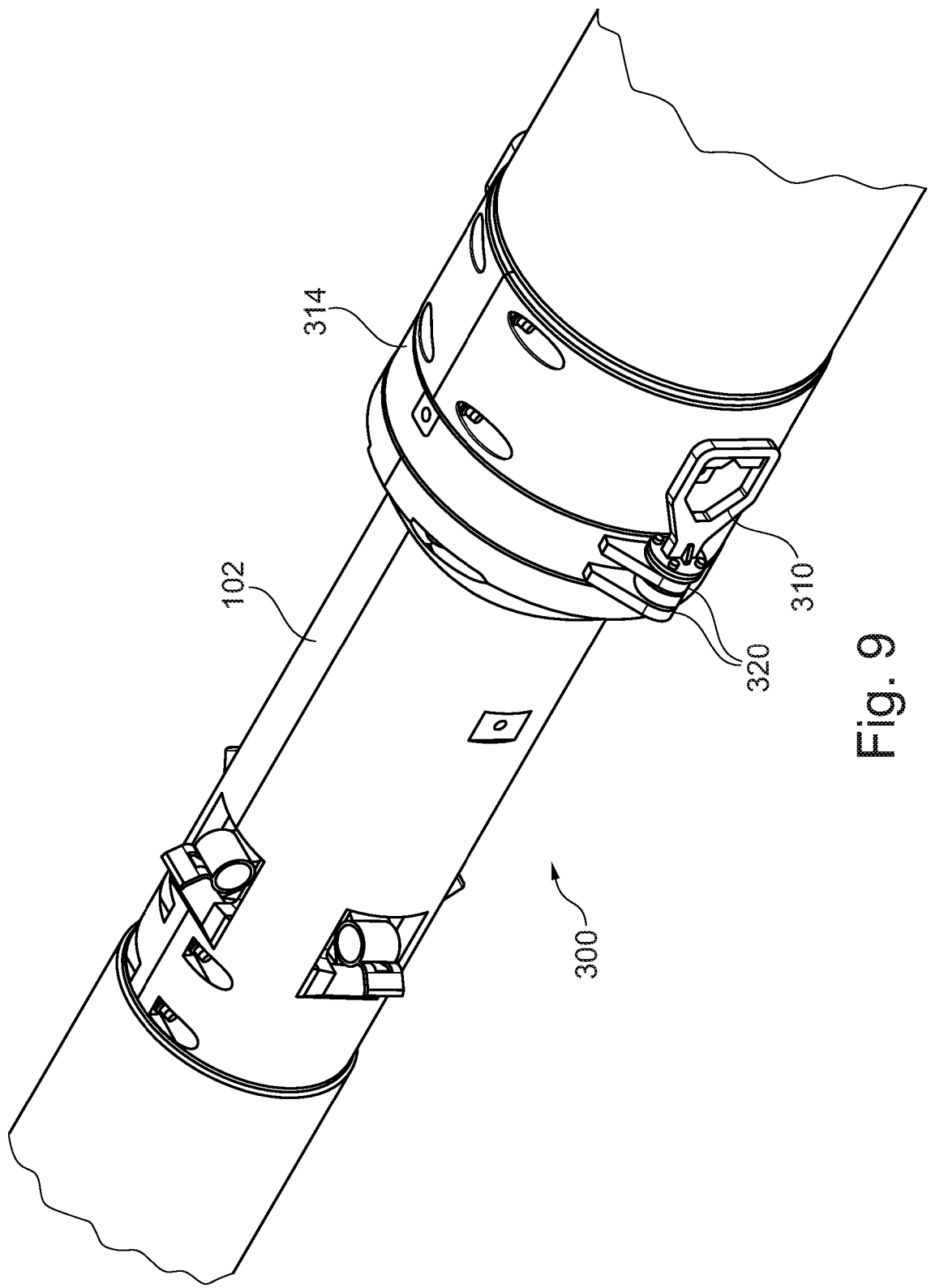
FIG. 9 illustrates a perspective view of another protection device.

FIG. 9 illustrates another protection device 300. Many of the features are substantially the same as those described above in relation to FIGS. 1 to 8, so for brevity will not be described again in detail. In this example, the collar member 314 is held in the locked configuration by two coupling elements 310 (only one coupling element is shown in FIG. 9), which couple the segments of the collar member 314 into the locked configuration. In other examples, only one coupling element 310 or a plurality of coupling elements, e.g. four coupling elements may be provided.

In this example, the collar member includes two segments. The coupling element 310 is a pin with a handle, although any suitable coupling element may be used, for example a screw or a bolt, with or without a handle. The coupling element is fed through holes of coupling flanges 320 situated on both segments, to couple the segments. In this example, there are coupling flanges coupled to or integral with a respective segment. In this example, the coupling flanges are located on either side of each segment, i.e. the segments of the collar member 214 are coupled to each other in two places. This allows access to the pins at any system orientation.

To remove the collar member 314, an ROV is deployed to apply a force to the handle of either/both coupling element 310 to remove the coupling element from the holes in the coupling flanges. Once removed, the collar member 314, falls away (i.e. to the unlocked configuration) and the body portion is free to move to the second configuration, as per the previous examples.

To prevent removal during normal operation, an elastomeric disc is secured to the front face of the pin (not shown). To remove the pin, this disc must be deformed through the holes of the coupling flanges and thus provides relatively high resistance against removal.

Figure 10B:
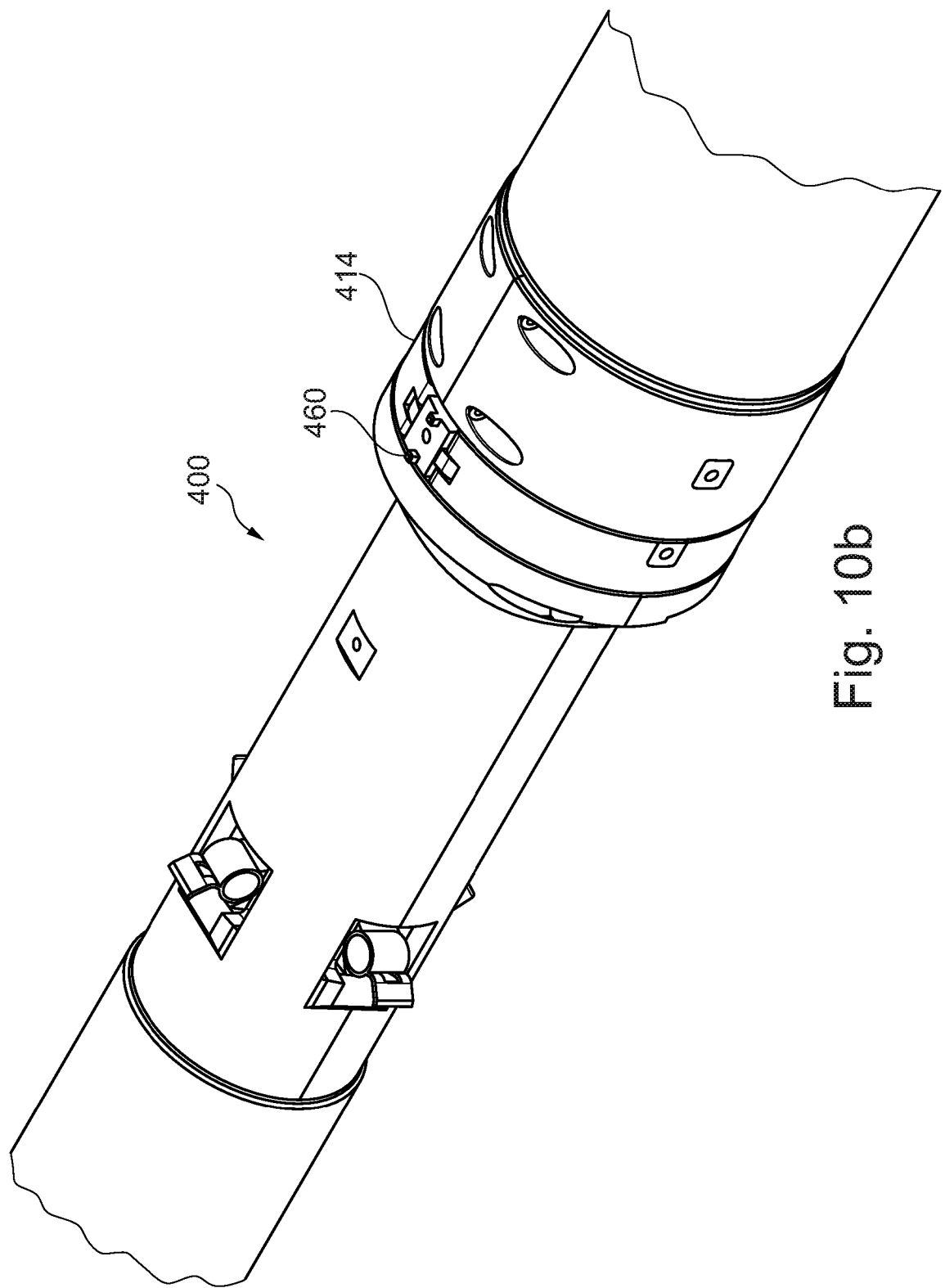
Figure 10C:
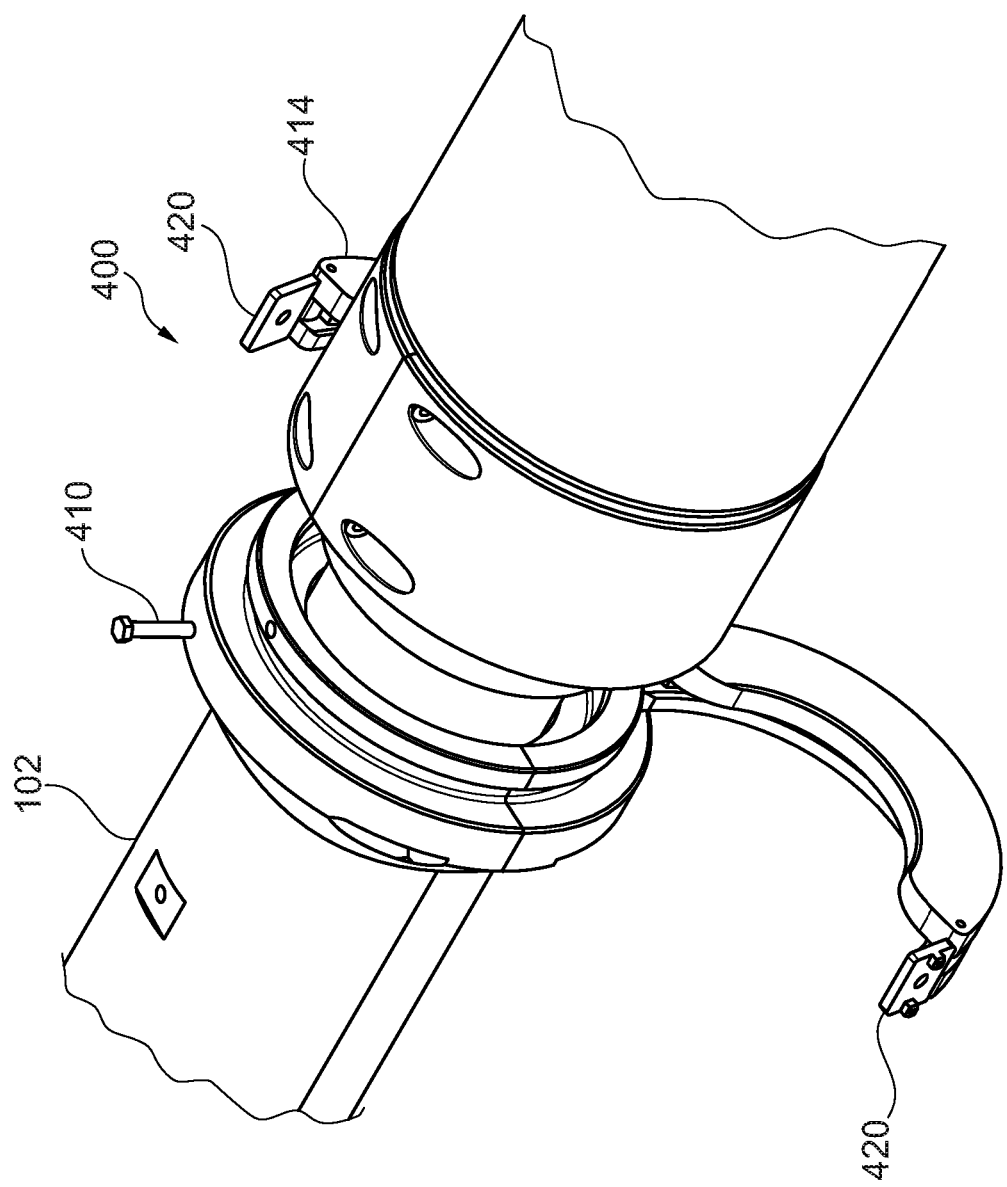

FIGS. 10a, 10b and 10c illustrate another protection device 400. The protection device 400 is similar to protection device 300, with the collar member 414 being held in place by a coupling element (and is moved from a locking configuration to an unlocking configuration in the same manner). In this example, the collar member 414 includes two segments. Each segment includes a double hinge assembly 420 arranged at each end thereof (only one hinge assembly is shown for each segment in FIG. 10c, for example).

Each hinge assembly 420 contains a central hole. The central holes of a hinge assembly 420, will align with the central hole of a corresponding hinge assembly 420 of the opposing segment when the assemblies are arranged on top of each other. To maintain the collar member 414 in a locking configuration, a coupling element 410 is passed through the central holes of both hinge assemblies when they are aligned. In this example, the coupling element is a bolt. The coupling element may be inset such that it does not protrude from the surface of the collar member 414 and present a snagging risk.

Specifically, FIG. 10b illustrates the collar member 414 in the locked configuration and FIG. 10C illustrates the collar member 414 in the unlocked configuration.

In this example, bearing points 460 on the radially outermost hinge assembly (when in the locked configuration), allow an ROV to generate torque to remove the coupling element 410.

Each coupling pin may be anchored into the sleeve member 102 by means of a thread hole or key locking mechanism or other suitable means. As such, when the opposite coupling element is removed, the remaining coupling element anchors the collar member 414 within the protection device 400, preventing the collar from falling away as the collar member 414 is moved from a locking configuration to an unlocking configuration.

Figure 14:
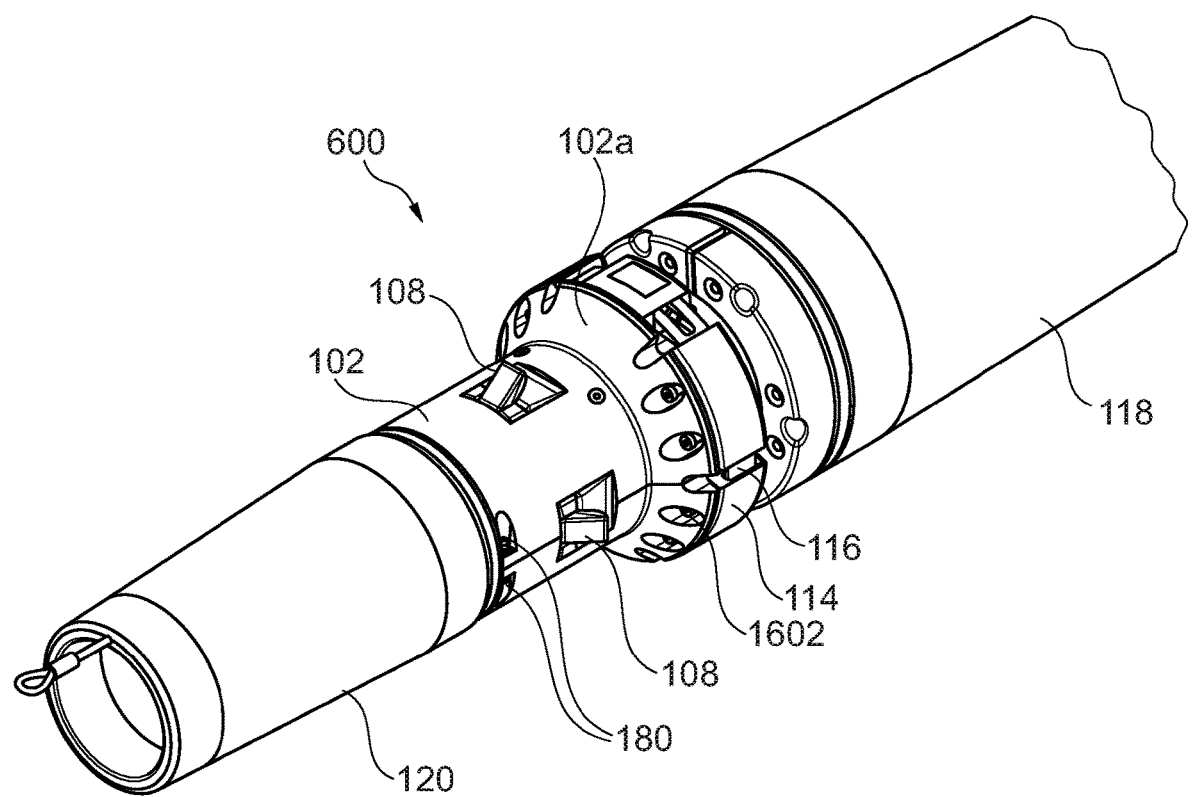
FIG. 14 illustrates a perspective view of another protection device.

FIG. 14 illustrates another protection device 600. The protection device 600 is similar to the protection device 100, with like features labelled with like reference numerals.

Figure 15:
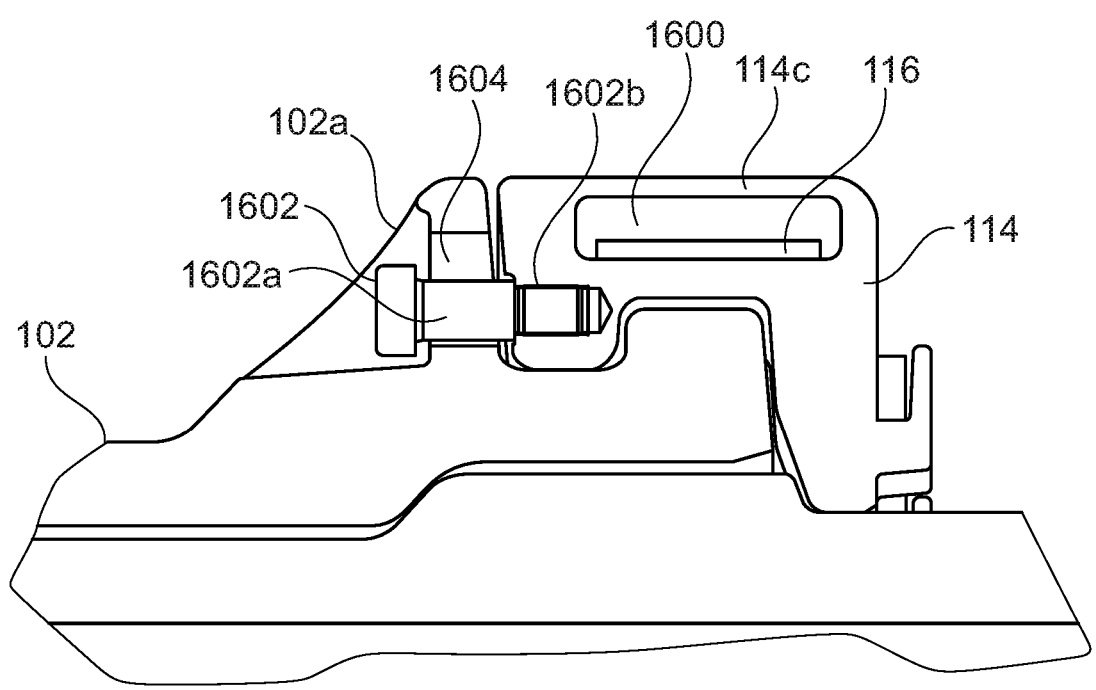
FIG. 15 illustrates a longitudinal cross-section of the collar portion of the protection assembly of FIG. 14.

In this example, each locking segment 144 (not specifically labelled in FIG. 14 or 15) of the collar member 114 includes a circumferential channel 1600 (as best shown in FIG. 15). Each locking segment 144 further includes a covering portion 114c overlying the corresponding circumferential channel 1600, such that the circumferential channel is enclosed by the covering portion 114c. The band element 116 is housed within the channel 1600 of each locking segment 144.

By housing the band element 116 in the covered circumferential channel 1600, the band element 116 is protected from abrasion. In addition, the covering portion 114c helps prevent the band element 116 from falling away from the collar member 114 once the band element is Cut.

The locking segments 144 of the collar member 114 are made by casting. Casting can allow the channel 1600 and the overlying covering portion 114c to be formed in the locking segment. In this example, the locking segments 144 are made from steel. Alternatively, the locking segments 144 may be made from cast iron or any other suitable material.

As per the previously described example, the locking segments 114 are brought into abutting relationship with adjacent segments through the tension of the band 116. Alternatively, the tension of the band may only bring the segments into a close, but non-abutting relationship with adjacent segments, to allow access for detachment of the band element 116.

In this example, the covering portion 114c only partially covers the channel 1600, allowing access for detachment of the band element 116. Alternatively, the covering portion 114c may entirely overly the channel 1600.

Figure 16:
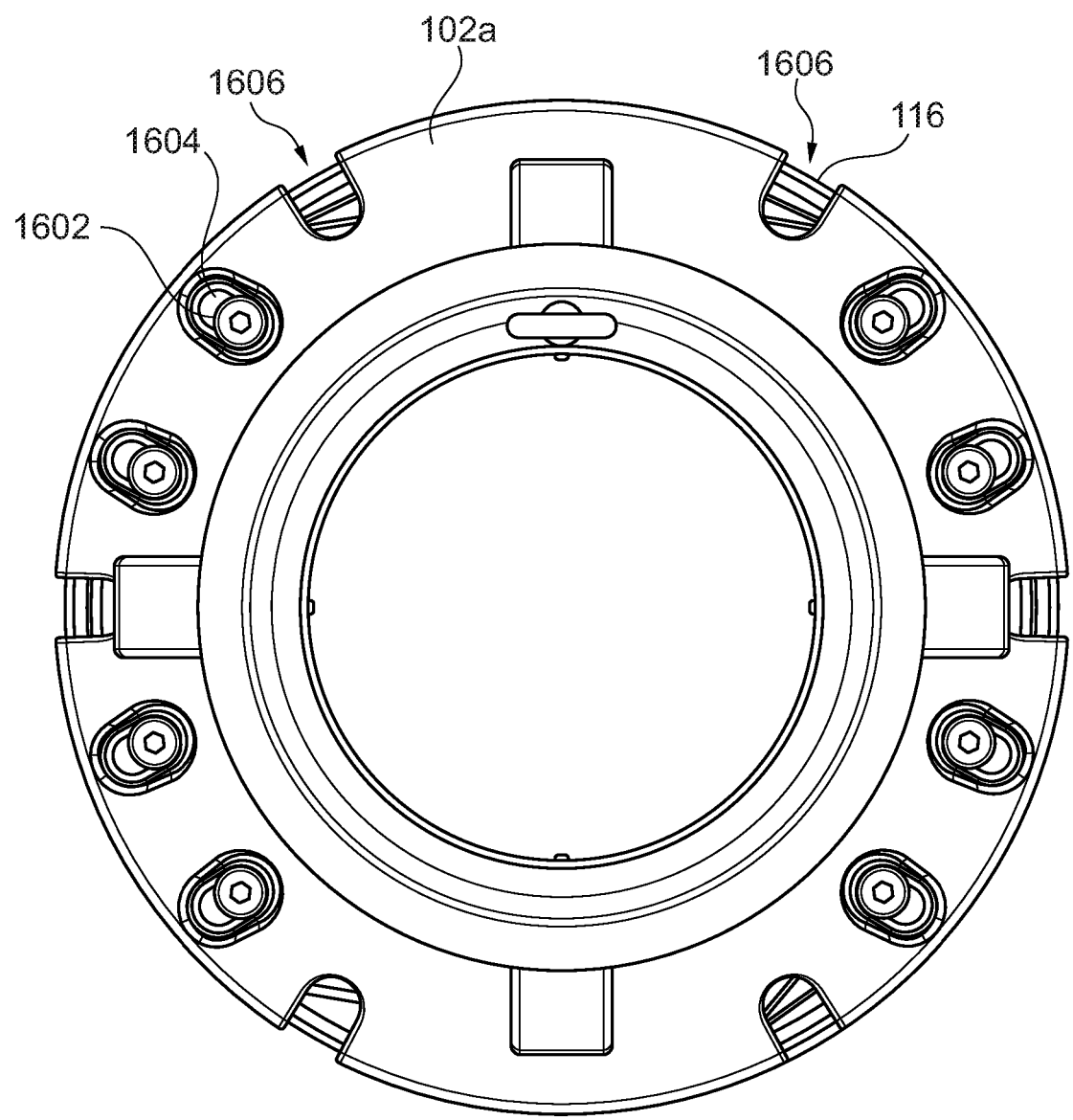
FIG. 16 illustrates an axial cross-section of the protection assembly of FIG. 14.

In this example, the sleeve member (specifically the flared portion 102a of the sleeve member) includes grooves 1606 aligned with any exposed portions of the band element 116 (as best shown in FIG. 16). Alternatively, the grooves may align with any gaps between adjacent segments (i.e. when the tension of the band brings the segments into a close, but non-abutting arrangement). Such grooves 1606 provide improved access for detachment of the band element 116.

In this example, the locking segments 144 are retained proximal to the sleeve member 102 by connecting means. That is, the connecting means help prevent the locking segments from falling away from the sleeve member upon detachment of the band element 116.

In this example, the connecting means are bolts 1602. The bolts 1602 are received within corresponding slots 1604 in the flared portion of the sleeve member 102a. A threaded end 1602b of each bolt 1602 threadably engages with a hole within a corresponding locking segment 144 of the collar member 114.

In this example, the bolts 1602 include an unthreaded portion 1602a, which is free to slide within the slots 1604. That is, each bolt 1602 is free to slide radially outwardly within the corresponding slot 1604 (as best shown in FIG. 16).

Each slot 1604 includes a radial axis (i.e. an axis extending substantially radially outwardly). The radial axis of each slot is aligned to guide movement of a corresponding locking segment 144, such that when the band element 116 is removed, the locking segments 144 of the collar portion 114 may translate outwardly in a substantially radial direction corresponding to the radial axis of each slot. This prevents unwanted circumferential movement and/or rotation of the collar portion 114, minimising the risk of damage and detachment.

In this example, there are two bolts 1602 per locking segment, although any number of bolts may be used per locking segment. The radial axis of the two slots corresponding to a single locking segment, are aligned (i.e. parallel) to allow both bolts and hence the locking segment to translate substantially radially outwardly upon detachment of the band element 116. The use of two bolts in this example allows much larger bolts to be used, which leads to increased robustness.

Figure 17A:
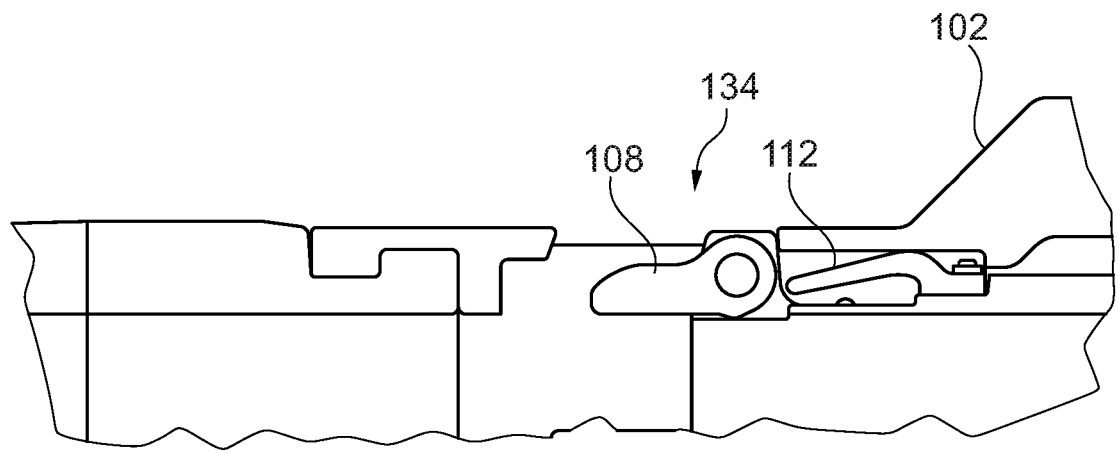
FIGS. 17a and 17b illustrate a longitudinal cross-section of the latching element of the protection assembly of FIG. 14 in the third and second positions respectively.
Figure 17B:
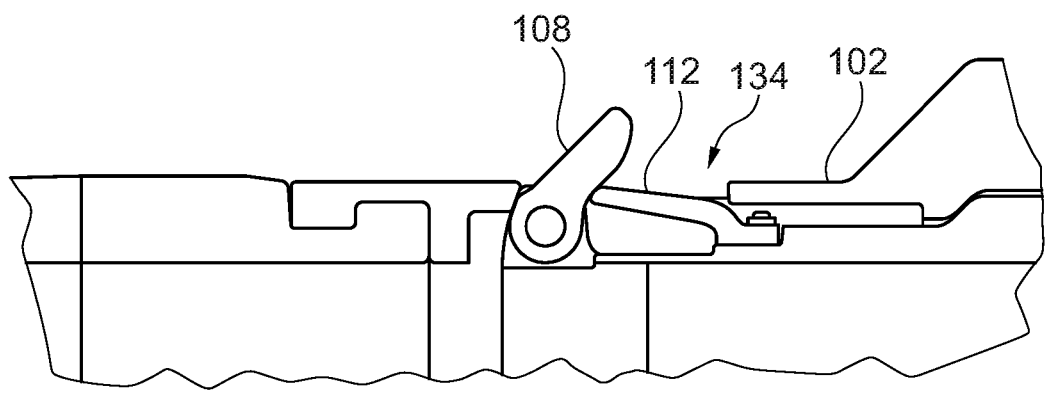

In this example, as opposed to the tubular cross section as shown in the previously described embodiments, the biasing element 112 has a cantilevered profile, as shown in FIGS. 17a and 17b. The principle of operation, in terms of biasing the latching element remains unchanged from the biasing element 112 in the previously described examples.

An advantage of a biasing element 112 with a cantilevered profile is that the deformation of the biasing element during retraction is much more controllable, i.e. it simply bends inwards. In addition, the biasing element 112 forms a flap, which fully covers the opening 134 and provides better protection against rock and sediment ingress, as shown best in FIG. 14 and FIG. 17b in particular.

Figure 13:
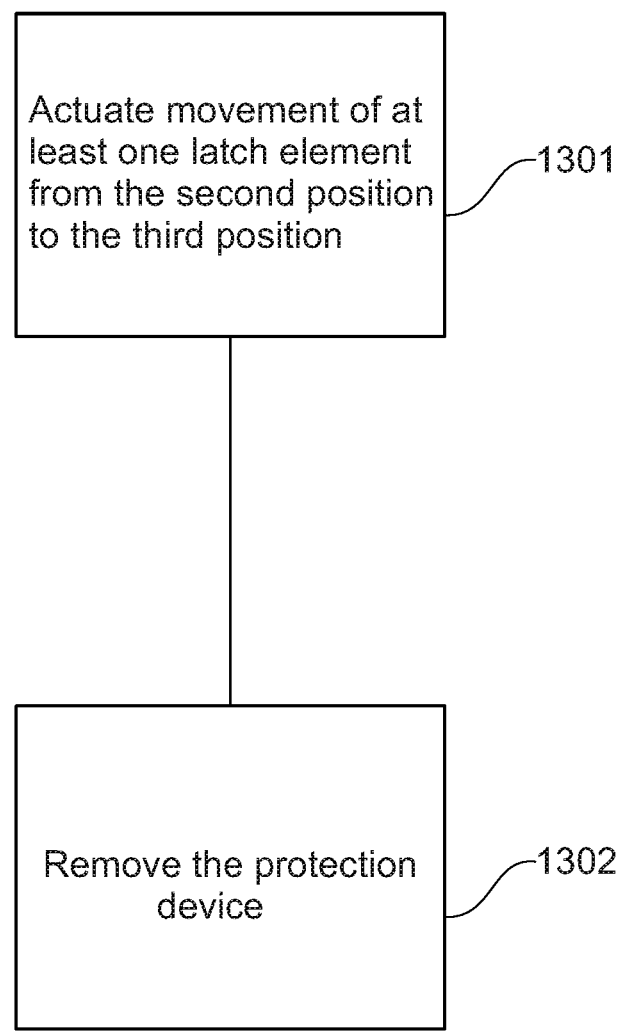
FIG. 13 illustrates a method of removing a protection device from an aperture.

FIG. 13 illustrates a method of removing the protection device according to any of the examples described herein from an aperture. The method includes at step 1301 actuating movement of at least one latch element 108 from the second position to the third position. Actuating movement may include moving the body portion from the first configuration to the second configuration. To allow movement of the body portion from the first configuration to the second configuration the collar member 414 may be moved from a locked to an unlocked configuration.

The method further includes at step 1302 removing the protection device from the aperture in the second direction. This may be achieved by applying a force to the protection device, i.e. pulling the protection device out using a winch. Alternatively, the protection device may be removed under its own weight.

Various modifications to the detailed arrangements as described above are possible. For example, there may be any number of latching elements. For example, there may be a single latching element. Alternatively, there may be 2, 3, 4 or even 8 latching elements. That is, there may be a plurality of latching elements. For examples where there are more than a single latching element, the latching elements may be arranged circumferentially around the shaft element and/or in rows (axially along the shaft element) depending on the system requirements. Multiple rows may help provide redundancy for safety requirements.

The latching elements 108 may be made from any suitable material. For example the latching elements may be made from steel, cast iron, polymer, reinforced polymer, composite or a combination thereof.

The latching elements 108 may have stepped contact faces incorporated to distribute the load evenly where the latching elements 108 contact the back-stop surface 106.

There may be any number of openings in the sleeve member 102, for example there may be just a single opening. Aptly, the sleeve member includes the same number of openings as latch members such that each latch member has a corresponding opening.

There may be any number of biasing elements. For example, there may be just one biasing element (i.e. one biasing element, which provides a biasing force to a single latching element or alternatively one biasing element, which provides a biasing force to a more than one latching element). Alternatively, there may be two or more biasing elements providing a biasing force to a single latching element. Any suitable biasing element may be used.

The biasing element in each of the previously described examples may be any suitable biasing element. In particular, any of the above examples may use a biasing element with 'tubular' cross section, as shown in the embodiments of FIGS. 1 to 12. Alternatively, any of the above examples may use a biasing element with a cantilever profile, as shown in the embodiments of FIGS. 14 to 17. Alternatively, any other suitable biasing element may be used.

In the above described examples, the latching elements 108 are held in the second position by a combination of a biasing force from the biasing element 112 and the location of the back-stop surface 106 of the sleeve member 102. That is, the biasing element 112 pushes the latching elements 108 against the back-stop surface 106. However, the latching elements 108 may be biased exactly to the second position, such that they are not forced against the back-stop surface 106. In such an example, as the protection device is removed from the aperture, the latching elements 108 would engage the aperture 126, which would push the latching elements 108 to the third position. Alternatively, the latching elements 108 may be biased to the third position.

Figure 12:
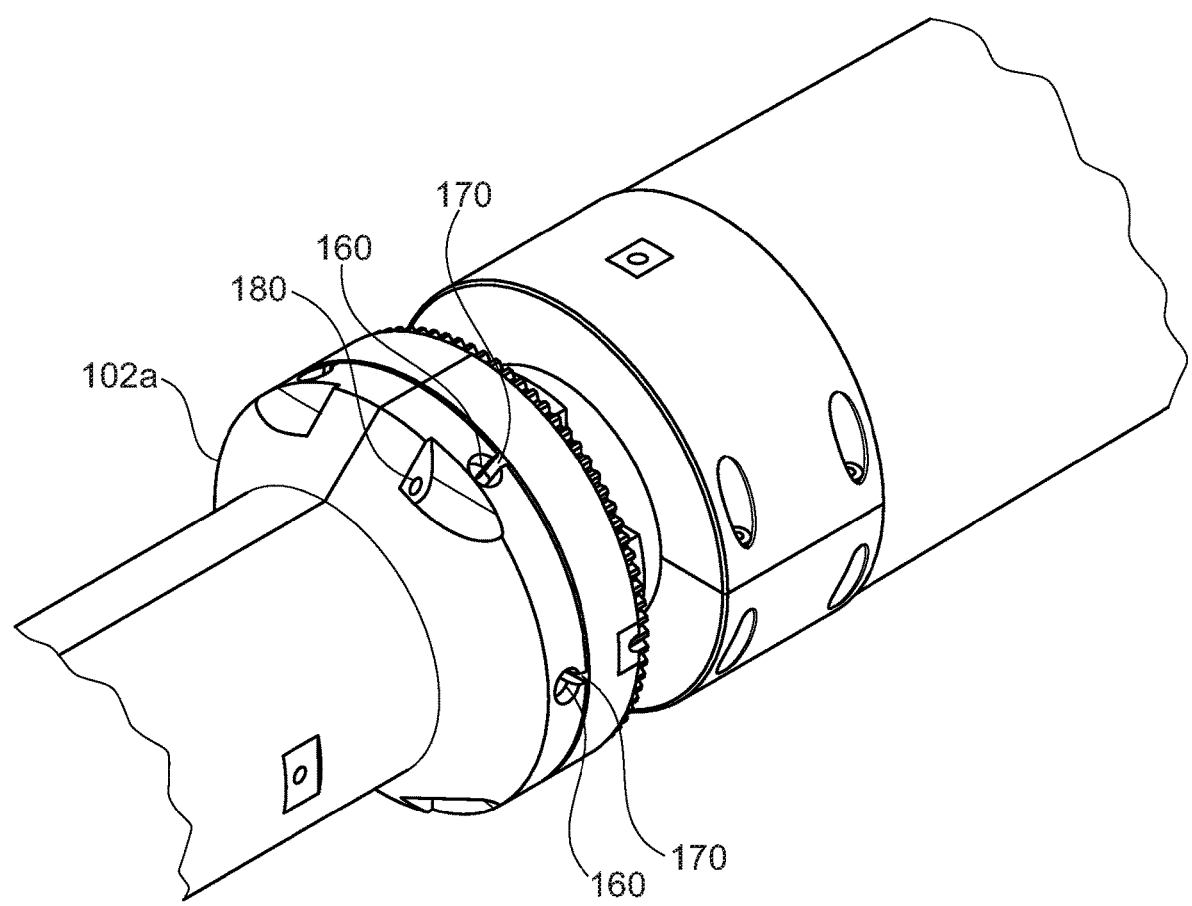
FIG. 12 illustrates a flared portion of a protection device.

As shown in FIG. 12, the flared portion 102a of the sleeve member 102 may include radial location holes 160 to aid the docking of an ROV tool onto the protection device in multiple orientations. The radial holes may also feature a radial slot 170 to aid the correct angular orientation of the ROV tool during the docking process. A pin mounted to the ROV interfaces into the hole, which can be used to react to moments imparted onto the ROV tool during rotation of the collar member.

The collar element may extend only partially around the body portion. The collar element may extend over the sleeve member 102 and/or the shaft element 104 of the body portion.

The collar member may include any number of segments. The segments may be entirely distinct from each other. Alternatively, the segments may be interconnected.

Figure 11:
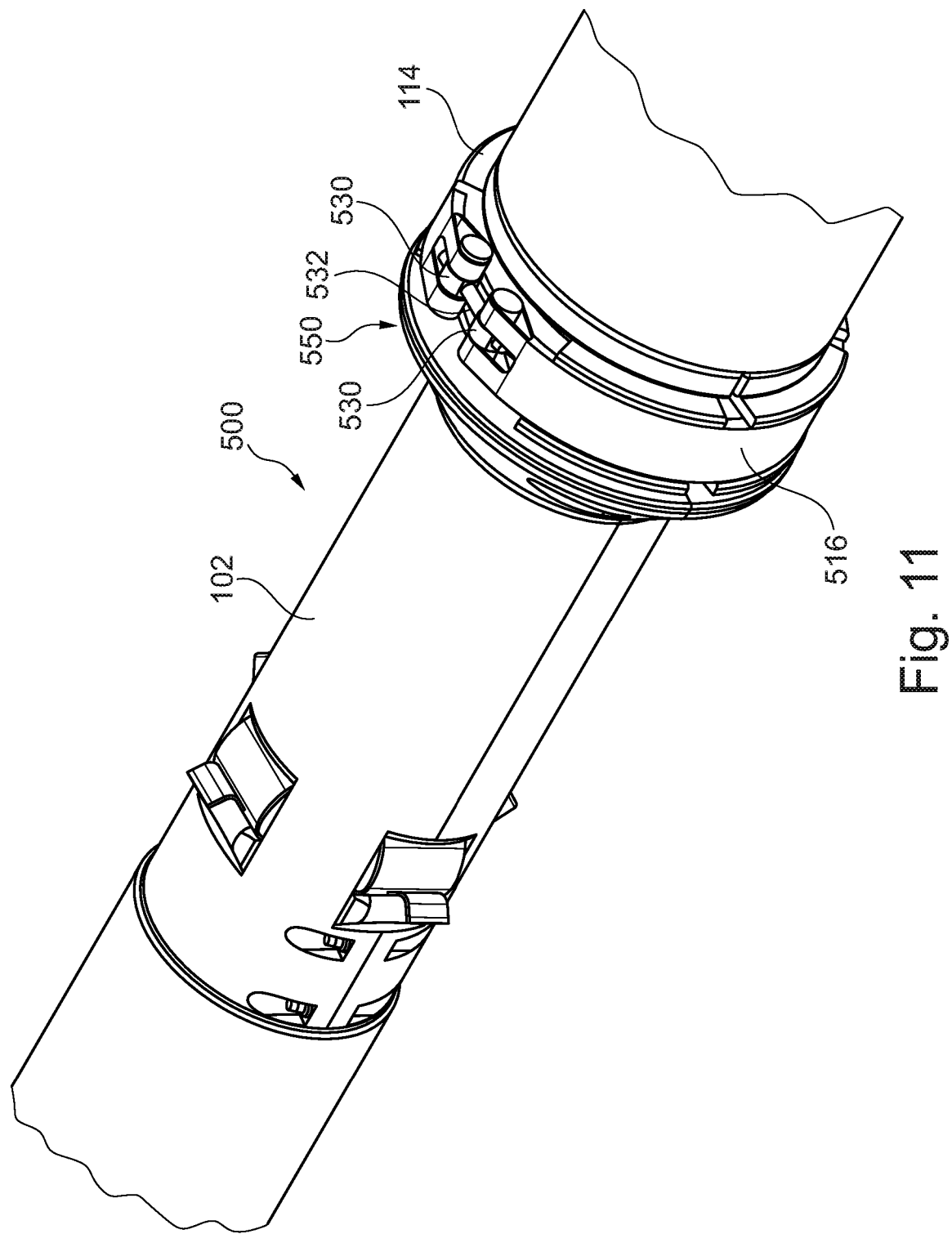
FIG. 11 illustrates another protection device.

The band element may extend around the entire circumference of the collar member. Alternatively, the band element may extend partially around the circumference of the collar member 114. FIG. 11 illustrates another protection device 500 in which the band element 516 extends only partially around the collar member 114. The ends of the band element 516 are coupled together by a tensioner arrangement 550, configured to increase tension in the band element 516. In this example, the tensioner arrangement 550, includes bar elements 530, coupled with respective ends of the band element 516. The tensioner arrangement further includes a tensioner element 532 coupled with the bar elements 530. The tensioner element 532 is configured to bring together the bar elements 530 to create tension in the band element 516. For example, the tensioner element 532 may be threadably engaged with one or both of the bar elements 530, such that rotation of the tensioner element 532 brings the ends of the band element 516 together.

Figure 18:
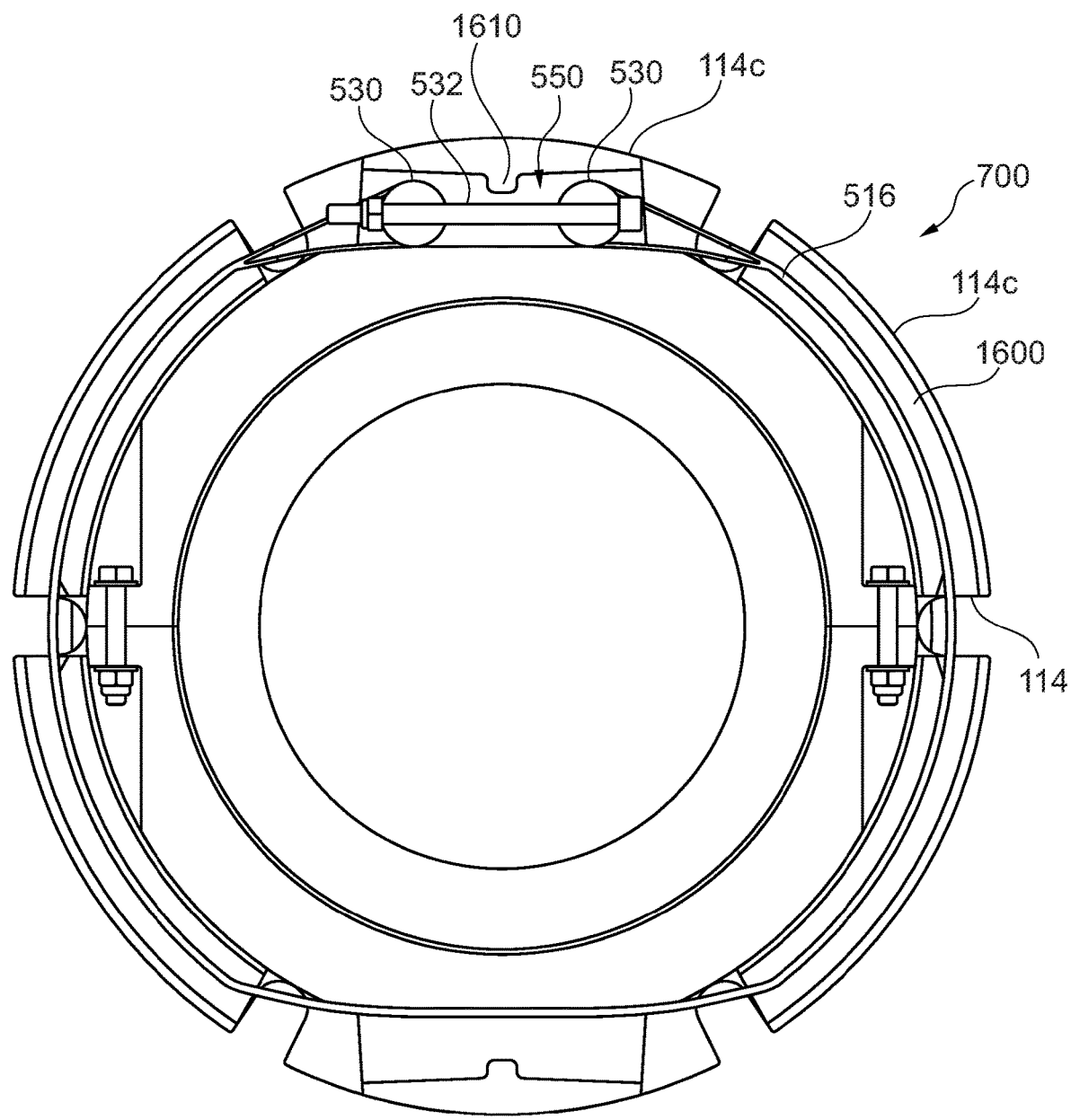
FIG. 18 illustrates a cross-section view of another protection device.

FIG. 18 illustrates an axial cross-section of another protection device 700, through the collar portion 114. In this example, the protection device 700 is similar to the protection device 600, in that the collar portion 114 includes a covered channel 1600. For brevity like features will not be discussed here. In this example, the band member 516 includes a tensioner arrangement 550, similar to the example shown in FIG. 11. In this example, the covering portion 114c of the collar portion 114 (or specifically the locking segment 144) overlies the tensioner arrangement 550. The covering portion 114c includes a protruding portion 1610 extending from an inner surface of the covering portion. The protruding portion 1610 prevents either bar element 530 of the tensioner arrangement from passing entirely through the covered channel of the corresponding locking segment 144. In this manner, the web portion 1610 retains the tensioner arrangement 550 in a substantially fixed circumferential position and hence prevents the tensioner arrangement 550 and band element 116 from falling out once the band element 516 is detached.

Figure 19:
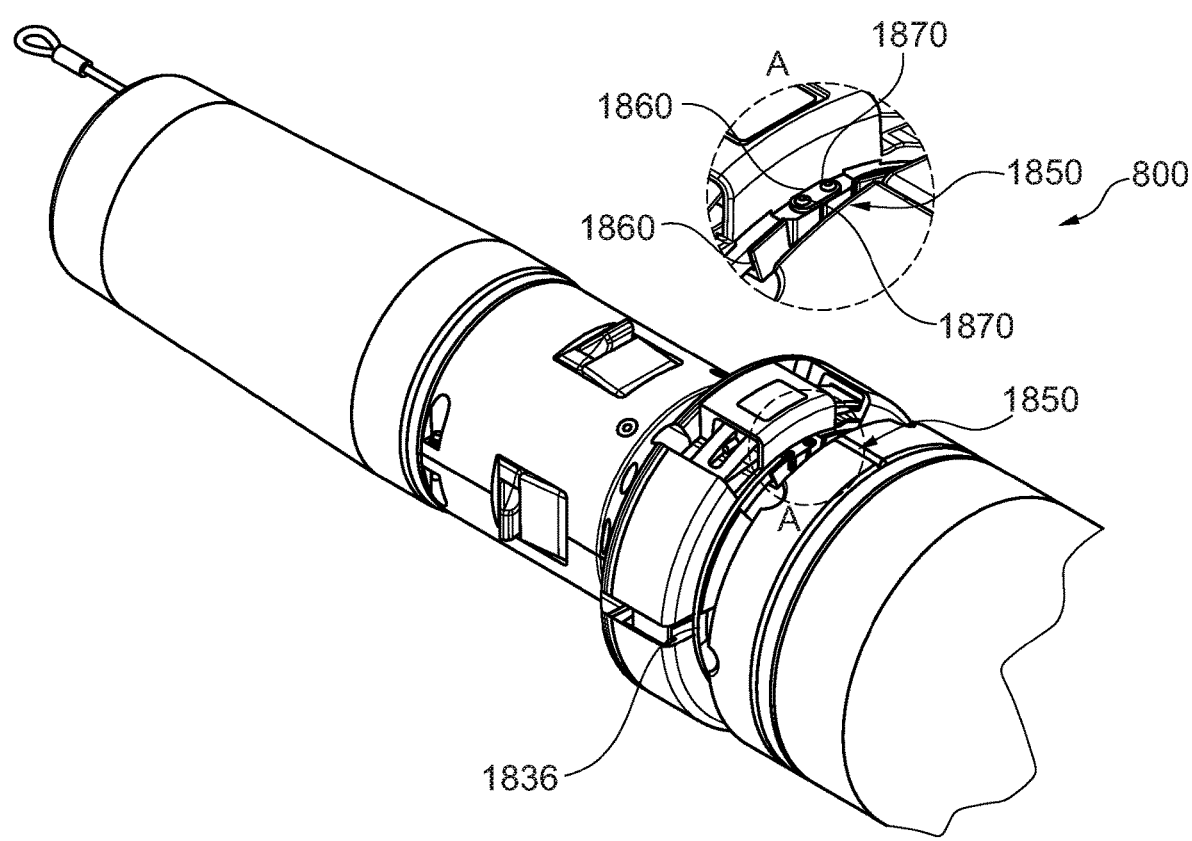
FIG. 19 illustrates a perspective view of another protection device.

The secondary band (for example the secondary band 136 of the previously described example) may include a tensioner arrangement. FIG. 19 illustrates another protection device 800. This example is similar to the example of FIGS. 14 to 17b and for brevity like features will not be discussed here. In this example the secondary band 1836 includes a tensioner arrangement 1850 (as best shown in the enlarged portion A of FIG. 19). In this example, the secondary band element 1836 is retained within an open groove 1860, which is formed in the collar portion 114. This allows the band to be wrapped around circumferentially during installation as opposed to being stretched over the assembly during installation (and hence speeds up assembly). During installation, the open ends of the secondary band element 1836 are wrapped circumferentially around the collar portion 114, within the groove 1860. The open ends are then secured with a locking plate 1860 and two locking bolts 1870, which prevent the ends separating and lifting out of the groove.

The collar member may not have a locked configuration and unlocked configuration as described for previous examples. The body portion instead may be moveable from a first configuration to a second configuration by rotation of the collar member relative to the body portion. That is, the collar member and the shaft element may be threadably engaged. The collar member is fixed axially relative to the sleeve member, such that rotation of the collar member may drive the shaft element in/out depending on the direction of rotation. Rotation of the collar may be achieved by a similar geared arrangement as described in previous examples.

The protection device of the above described examples may be coupled to the bend limiting device and second bend limiting device of the protection assembly in any suitable manner. For example, any of the above described protection devices may include a further collar member for coupling the protection device to the second bend limiting device.

The protection device 100 may be used in a protection assembly including any suitable components. For example, a protection assembly for an elongate flexible member including a protection device of any of the above described examples; and a bend limiting device for resisting bending of an elongate flexible member passing through the aperture. The bend limiting device may include an elongate flexible body adapted to pass through the aperture and having an internal passageway for allowing movement of an elongate flexible member therethrough. An attachment means may also be included adjacent a first end of the body for enabling attachment of a pulling member thereto to enable pulling of the device through the aperture.

The protection device 100 may be withdrawn with or without the cable 122 inside. That is, the protection device 100 is not clamped to the cable 122, such that the cable can be pulled-through the protection device 100 before removal of the protection device 100.

The above described examples have several advantages over known systems.

The latching elements are sprung loaded, so there is no risk of early deployment preventing entry into the foundation.

Moving the collar member 114 from a locked to an unlocked configuration by removal of the band element 116 or coupling element 310 provides the advantage that the protection device 100 can be removed without the use of bespoke tools, e.g. tools that require hydraulic power from either hydraulic downlines from an on-board HPU (Hydraulic Power Unit) or integration into the ROV's hydraulic circuit, which reduces operation time.

The configurations described above, with distinct first and third positions, ensures that the release mechanism can be operated with little applied force from ROV. That is, the release mechanism is actuated as the protection assembly is removed. I.e. as a winching force is applied to the protection assembly the release mechanism actuates with little additional work required from the ROV (other than to remove the band element 116 or the coupling element or rotate the collar member). The release mechanism works with the bias of the biasing element 112, as opposed to against it. Alternatively, the release mechanism may actuate under the self-weight of the shaft element 104.

As the latching elements 108 are at least partially enclosed by the sleeve member 102, they cannot fall-out during operation, thus eliminating the need to restrain the pins 110 by interference fits or fixings during assembly, reducing cost and assembly time.

The mechanism is driven by the load applied to retract the protection device. The operation can be performed using anything from an onsite Cable Lay Vessel, to a commonly available multicat vessel. As the retraction of the protection device is not reliant on the physical limitation (e.g. power) of an ROV and/or ROV tool, a light-class ROV can be used. In addition, performance is less affected by accumulation of marine growth and sedimentation. The operation can be fully diver-less and can be performed during cable installation, after cable installation or after cable removal.

The above described examples allow for a vessel offset of +/−10 degrees. That is the angle of insertion of the protection device can deviate by substantially +/−10 degrees from the central axis of the aperture without preventing insertion.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A protection device comprising:
   a body portion adapted to be inserted into an aperture in a first direction and having an internal passageway for allowing movement of an elongate flexible member therethrough;
   at least one latching element pivotally mounted on the body portion for engaging an edge of the aperture to prevent removal of the body portion from the aperture in a second direction, opposite to the first direction, after insertion of the body portion into the aperture in the first direction, to prevent the elongate member from engaging the edge of the aperture;
   wherein the at least one latching element is pivotally mounted to the body portion for moving between:
   a first position enabling insertion of the body portion into the aperture in the first direction
   a second position preventing removal of the body portion from the aperture in the second direction; and
   a third position enabling removal of the body portion from said aperture in the second direction.

2. The device according to claim 1, wherein the body portion is configured to move from a first configuration, preventing the at least one latching element from moving to the third position, and a second configuration enabling at least one latching element to move to the third position.

3. The device according to claim 2, wherein the body portion comprises a shaft element and a sleeve member surrounding the shaft element; and
   wherein when the body portion is in the first configuration, the sleeve member is configured to prevent the at least one latching element moving to the third position.

4. The device according to claim 2, wherein the at least one latching element is biased in a direction towards the third position.

5. The device according to claim 1, wherein the body portion comprises a shaft element and a sleeve member surrounding the shaft element.

6. The device according to claim 5, wherein the at least one latching element is pivotally mounted on the shaft element.

7. The device according to claim 5, wherein the sleeve member comprises at least one opening, through which the at least one latching element projects.

8. The device according to claim 5, wherein the sleeve member is configured to slide axially relative to the shaft element to move the body portion from the first configuration to the second configuration.

9. The device according to 1, wherein the at least one latching element is biased away from the first position.

10. The device according to claim 1, wherein when in the first position, the at least one latching element is oriented in a first latching element direction; and
    wherein when in the third position, the at least one latching element is oriented in a second latching element direction, substantially opposed to the first direction.

11. The device according to claim 10, wherein the body portion is configured to move from a first configuration, preventing the at least one latching element from moving to the third position, and a second configuration enabling at least one latching element to move to the third position.

12. The device according to claim 11, wherein the body portion comprises a shaft element and a sleeve member surrounding the shaft element; and
  wherein the sleeve member is configured to slide axially relative to the shaft element to move the body portion from the first configuration to the second configuration.

13. The device according to claim 10, wherein the body portion comprises a shaft element and a sleeve member surrounding the shaft element; and
  wherein the at least one latching element is pivotally mounted on the shaft element.

14. The device according to claim 10 further comprising a collar member including two or more segments extending at least partially around the body portion.

15. The device according to claim 14, wherein the body portion is configured to move from a first configuration, preventing the at least one latching element from moving to the third position, and a second configuration enabling at least one latching element to move to the third position;
  wherein the collar member is configured to have a locked configuration and an unlocked configuration;
  wherein in the locked configuration, the body portion is fixed in the first configuration by the collar member; and
  wherein in the unlocked configuration, the body portion is moveable from the first configuration to the second configuration.

16. The device according to claim 1 further comprising a collar member extending at least partially around the body portion.

17. The device according to claim 16, wherein the body portion is configured to move from a first configuration, preventing the at least one latching element from moving to the third position, and a second configuration enabling at least one latching element to move to the third position;
  wherein the collar member is configured to have a locked configuration and an unlocked configuration;
  wherein in the locked configuration, the body portion is fixed in the first configuration by the collar member; and
  wherein in the unlocked configuration, the body portion is moveable from the first configuration to the second configuration.

18. The device according to claim 16, wherein the collar member comprises two or more segments.

19. A protection assembly comprising:
  the protection device according to claim 1; and
  a bend limiting device for resisting bending of an elongate flexible member passing through the aperture, the bend limiting device comprising:
    an elongate flexible body adapted to pass through the aperture and having an internal passageway for allowing movement of an elongate flexible member therethrough; and
    attachment means adjacent a first end of the elongate flexible body for enabling attachment of a pulling member thereto to enable pulling of the protection device through the aperture.

20. A method of removing the protection device according to claim 1 from an aperture, the method comprising:
  actuating movement of at least one latch element from the second position to the third position; and
  removing the protection device from the aperture in the second direction.

\* \* \* \* \*